(12) United States Patent
Hwang

(10) Patent No.: US 11,093,696 B2
(45) Date of Patent: Aug. 17, 2021

(54) PLAYABLE TEXT EDITOR AND EDITING METHOD THEREFOR

(71) Applicant: Young Seok Hwang, Hwaseong-si (KR)

(72) Inventor: Young Seok Hwang, Hwaseong-si (KR)

(*) Notice: Subject to any disclaimer, the term of this patent is extended or adjusted under 35 U.S.C. 154(b) by 0 days.

(21) Appl. No.: 17/015,508

(22) Filed: Sep. 9, 2020

(65) Prior Publication Data

US 2021/0042464 A1   Feb. 11, 2021

Related U.S. Application Data

(63) Continuation of application No. PCT/KR2019/004480, filed on Apr. 15, 2019.

(30) Foreign Application Priority Data

Apr. 13, 2018  (KR) .................. 10-2018-0043363

(51) Int. Cl.
  *G06F 40/166*  (2020.01)
  *G06F 40/106*  (2020.01)
(52) U.S. Cl.
  CPC .......... *G06F 40/166* (2020.01); *G06F 40/106* (2020.01)
(58) Field of Classification Search
  CPC .............. G06F 40/166; G06F 40/106
  See application file for complete search history.

(56) References Cited

U.S. PATENT DOCUMENTS

| | | | |
|---|---|---|---|
| 561,811 A | 6/1896 | Park | |
| 5,442,788 A | 8/1995 | Bier | |
| 6,148,304 A * | 11/2000 | de Vries | G06F 9/451 |
| 6,360,237 B1 * | 3/2002 | Schulz | G06F 40/166 |
| | | | 715/255 |
| 8,533,593 B2 * | 9/2013 | Grossman | G11B 27/34 |
| | | | 715/704 |
| 8,533,594 B2 * | 9/2013 | Grossman | G06F 40/197 |
| | | | 715/704 |
| 8,533,595 B2 * | 9/2013 | Grossman | G06F 40/197 |
| | | | 715/704 |

(Continued)

FOREIGN PATENT DOCUMENTS

| | | |
|---|---|---|
| KR | 10-2005-0102521 A | 10/2005 |
| KR | 10-2008-0109077 A | 12/2008 |

(Continued)

OTHER PUBLICATIONS

Kyu-Seek Sohn et al.; "A Framework for Continuous Real-time Collaborative Editing"; The Journal of Korean Institute of Communications and Information Sciences; Sep. 2011; pp. 1049-1056; vol. 36; No. 9. with Partial English Translation.

(Continued)

*Primary Examiner* — Asher D Kells

(74) *Attorney, Agent, or Firm* — Studebaker & Brackett PC

(57) ABSTRACT

Provided is a playable text editor. The playable text editor discloses a storage unit for receiving first text from a user and storing the first text together with first time information when the first text was input, a control unit for receiving a playback request from the user and sequentially outputting the first text based on the first time information, and a search unit including a first timeline through which the first time information is searchable.

18 Claims, 20 Drawing Sheets

(56) References Cited

U.S. PATENT DOCUMENTS

| | | | |
|---|---|---|---|
| 9,910,576 B2* | 3/2018 | Moffatt | G11B 27/34 |
| 10,511,551 B2* | 12/2019 | Han | H04L 51/04 |
| 2002/0112180 A1* | 8/2002 | Land | G11B 27/034 |
| | | | 726/26 |
| 2008/0034039 A1 | 2/2008 | Cisler | |
| 2010/0138756 A1* | 6/2010 | Saund | H04L 12/1827 |
| | | | 715/758 |
| 2011/0055702 A1* | 3/2011 | Jakobson | G06F 40/197 |
| | | | 715/723 |
| 2011/0060751 A1* | 3/2011 | English | G06F 16/438 |
| | | | 707/758 |
| 2012/0233137 A1* | 9/2012 | Jakobson | G06F 40/197 |
| | | | 707/695 |
| 2012/0272173 A1* | 10/2012 | Grossman | G06Q 10/103 |
| | | | 715/772 |
| 2013/0298016 A1* | 11/2013 | Chigier | G06F 40/103 |
| | | | 715/256 |
| 2017/0090688 A1* | 3/2017 | Anderson | G06F 3/0482 |
| 2017/0220546 A1* | 8/2017 | Codrington | G06F 3/0484 |
| 2018/0276189 A1* | 9/2018 | Bache | G11B 27/031 |
| 2018/0349002 A1* | 12/2018 | Kindelsberger | G06F 3/0484 |
| 2019/0116212 A1* | 4/2019 | Spinella-Mamo | G06F 40/194 |
| 2020/0264905 A1* | 8/2020 | Fox | G06F 3/167 |

FOREIGN PATENT DOCUMENTS

| | | |
|---|---|---|
| KR | 10-2012-0090794 A | 8/2012 |
| KR | 10-2015-0112113 A | 10/2015 |
| KR | 10-1826625 B1 | 2/2018 |

OTHER PUBLICATIONS

An Office Action mailed by the Korean Intellectual Property Office dated Sep. 25, 2020, which corresponds to Korean Patent Application No. 10-2019-0158335 and is related to U.S. Appl. No. 17/015,508 with English language translation.

Peter Weverka "PowerPoint 2007 All-in-One Desk Reference for Dummies", Wiley Publishing, Inc.; published Jan. 10, 2007, pp. 1-646; See pp. 193, 416, 428-431, and 441-442.

International Search Report issued in PCT/KR2019/004480; dated Aug. 6, 2019.

* cited by examiner

100

In the wake of the growing popularity of Korea's pop music, a private K-pop international school will be established in Seoul next year.

The school, set to be co-founded by SM Entertainment, Korea's largest star management agency, and Jongro Academy, one of the country's leading private educational institutes, aims |
~110

200  210                 300                      08:21/16:40
                                                      220

PLAYABLE TEXT EDITOR AND EDITING METHOD THEREFOR

CROSS-REFERENCE TO RELATED APPLICATION

This application is a Continuation of International Application No. PCT/KR2019/004480 filed on Apr. 15, 2019, which claims benefit of priority to Korean Patent Application No. 10-2018-0043363 filed on Apr. 13, 2018, the entire content of which is incorporated herein by reference.

BACKGROUND

1. Technical Field

The present inventive concept relates to a playable text editor and a method for editing thereof. More specifically, it relates to an editor capable of editing/deleting input text while playing the input text as it is, and a method for editing using the same.

2. Description of the Related Art

Today, computers are at the center of people's daily lives. It is becoming more common to create necessary documents using document editing software such as Word or Hangul on a computer than to create documents using a pencil or pen. In particular, due to the development of portable devices such as a smart phone or a tablet, electronic documents are more often used than paper documents.

However, the document editing software such as Hangul and Word that is currently being serviced is limited to displaying, modifying, and deleting input text. Of course, some software provides the ability to track revision history. However, these functions are also simply comparing and showing the details before and after the modification is completed.

However, in a certain field, for example, in the field of education, there is a case where a text input process is provided to a user while being played. In addition, there are cases where playback must be stopped and edited during playback. This is not only to provide a complete form of text, but also to enhance the educational effect by providing an input process together.

However, there is no text editor capable of playing a text input process as it is while modifying/deleting text.

SUMMARY

Aspects of the present inventive concept provide a playable text editor and a method for editing thereof.

Aspects of the present inventive concept provide a playable text editor, comprising a storage unit for receiving first text from a user and storing the first text together with first time information when the first text was input, a control unit for receiving a playback request from the user and sequentially outputting the first text based on the first time information, and a search unit including a first timeline through which the first time information is searchable.

Aspects of the present inventive concept also provide a method for editing playable text, comprising receiving, by a text editor, first text from a user and storing the first text together with first time information when the first text was input, receiving, by the text editor, a playback request from the user and sequentially outputting the first text based on the first time information and providing, by the text editor, a first timeline through which the first time information is searchable.

However, aspects of the present inventive concept are not restricted to those set forth herein. The above and other aspects of the present inventive concept will become more apparent to one of ordinary skill in the art to which the present inventive concept pertains by referencing the detailed description of the present inventive concept given below.

The benefits of the present inventive concept are as follows.

Using a text editor and a method for editing text proposed in the present inventive concept, it is possible to provide a user with an input process, not only an edited result of the text. Therefore, this may have a great benefit in areas where a text input process is important. In particular, it is possible to increase the educational effect in learning fields such as programming method learning, grammar/writing method learning, and math problem solving learning.

In addition, using the text editor and the method for editing the text proposed in the present inventive concept, an edited version may be easily managed when editing text during text playback. In addition, a dictation mode or a write-first mode for learning may be provided. As described above, according to the present inventive concept, there is a benefit of maintaining interest in learning through interaction with a user and increasing the efficiency of learning.

The benefits of the present inventive concept are not limited to the benefits mentioned above, and other benefits not mentioned may be clearly understood by those skilled in the art from the description below.

BRIEF DESCRIPTION OF THE DRAWINGS

The above and other aspects and features of the present inventive concept will become more apparent by describing in detail exemplary embodiments thereof with reference to the attached drawings, in which.

DETAILED DESCRIPTION OF THE EMBODIMENTS

Hereinafter, preferred embodiments of the present disclosure will be described with reference to the attached drawings. The present disclosure may, however, be embodied in many different forms and should not be construed as being limited to the embodiments set forth herein. The present disclosure will only be defined by the appended claims.

In addition, in describing the component of this inventive concept, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

The terms defined in the commonly used dictionaries are not ideally or excessively interpreted unless they are specifically defined clearly. The terminology used herein is for the purpose of describing particular embodiments only and is not intended to be limiting of the inventive concept.

Hereinafter, some embodiments of the present inventive concept will be described in detail with reference to the accompanying drawings.

FIGS. 1 to 4 are diagrams for explaining a playback mode and an editing mode of a playable text editor according to an embodiment of the present inventive concept.

Figure 1:
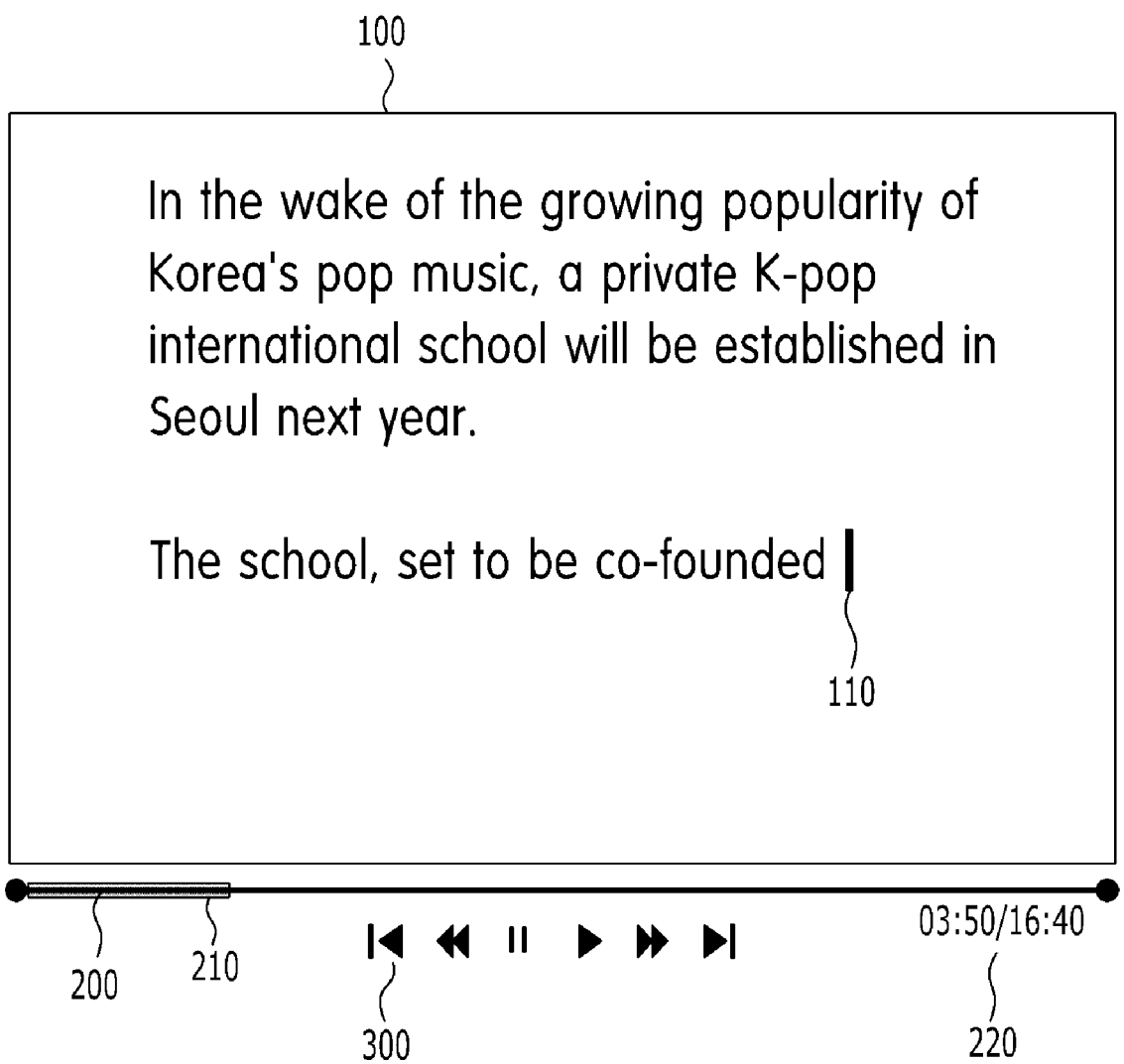
FIGS. 1 to 4 are diagrams for explaining a playback mode and an editing mode of a playable text editor according to an embodiment of the present inventive concept.

Referring to FIG. 1, it may be seen that English text is input to the playable text editor 100. The currently input text is "In the wake of the growing popularity of Korea's pop music, a private K-pop international school will be established in Seoul next year. The school, set to be co-founded." Here, it may be seen that that a cursor 110 is positioned after the last "co-founded."

In a typical editor, text is displayed like this, and it waits for user input while the cursor is positioned at a position to edit the text. However, the playable text editor 100 proposed in the present inventive concept plays a text input process as it is. Therefore, a timeline 200 for playing the process in which the text was previously input may be positioned at the bottom.

The timeline 200 may provide the current playback time in the form of a bar graph 210. In addition, the timeline 200 may provide time information 220 regarding the total time spent inputting the text and the currently played time. In the example of FIG. 1, the corresponding text is text input for a total of 16 minutes and 40 seconds, and input contents up to 03 minutes and 50 seconds are currently played.

Figure 2:

Comparing with FIG. 2, in FIG. 2, the current playback time is 08 minutes and 21 seconds. This is a situation in which 04 minutes and 31 seconds are played more than in the case of FIG. 1. Accordingly, the text "by SM Entertainment, Korea's largest star management agency, and Jongro Academy, one of the country's leading private educational institutes, aims" is further input, as compared to the case of FIG. 1. In addition, it may be seen that the cursor 110 is positioned after the last text "aims."

Further, the playable text editor proposed in the present inventive concept may provide a control bar 300 capable of controlling the timeline 200 together with the timeline 200. It is possible to return to the beginning, pause, play again, play forward or backward quickly, or move last by the control bar 300. This is a function provided by general video players and music players, and this function is also applied to the playable text editor 100.

Referring to FIGS. 1 and 2, the text editor 100 proposed by the present inventive concept does not only store the final text of the text like a general text editor, but also stores the input process together. The text editor 100 proposed by the present inventive concept stores the process of inputting text into an area where text may be edited and played as it is with a frame time. In addition, information on a user who input the text is also stored. Here, the text input process includes not only a process of adding text, but also a process of erasing text with a backspace and re-inputting it.

When a text file, for example, a hwp file, a txt file, a docx file, etc. is executed in a general text editor, only the final copy of the text is provided to the user. On the other hand, if a text file created in the text editor proposed by the present inventive concept, for example, a pte file created in the playable text editor, is executed, the text input process is sequentially played from 00 minutes and 00 seconds to the time required to input the text.

It mainly explains the text to help understand the inventive concept. However, in addition to inputting text, external objects such as images and images may be inserted as in general document creation software. Further, it is possible to change a font and font size of the text. In addition, such external object insertion, or a change in text font and font size may be recorded as they are in time order.

In addition, when inserting while drawing an image in the text editor, for example, when using a touch pen on a tablet's touch screen to write lecture content or input a mathematical formula, it may record and store each user's input as it is. In other words, the text editor proposed in the present inventive concept generally targets keyboard input as a recording target. However, in addition to that, it may target a stroke on a touch pen or touch screen, or a stroke input (touch screen input) as a recording and playing target.

The text input process or text recording process of the playable text editor 100 proposed in the present inventive concept has been described above. When the text file is recorded, a text file is played in time frame. Here, a playback unit may be played in keyboard input, word unit, sentence unit, sentence or line unit, paragraph unit, or other units. Here, as described above, the content played includes not only the addition of text, but also the deletion of characters such as backspace or delete.

Moreover, the addition and deletion of text, as well as the insertion of external objects such as the insertion of images or videos in addition to text in the document creation software, may be recorded and played back. Here, it is also possible to record and play content such as inserting an image and changing its size, and the act of inserting a video and playing it may also be recorded and played. In addition, it is possible to record and insert voice. As described above, the playable text editor proposed by the present inventive concept may insert and edit various types of content in addition to text. However, hereinafter, modifications/deletions of text will be mainly described to help understanding the inventive concept.

The text editor proposed by the present inventive concept may display information on an owner who input the content while playing the text input process. This may be provided by displaying user information on a screen for playing text, or displaying a progress status bar 210 on the timeline 200 through different colors for each user. For example, when it is input by a user A for the first 5 minutes and by a user B for the latter 5 minutes during the 10 minute text entry process, the progress status bar 210 of the timeline 200 may be displayed as a red bar for the user A for the first 5 minutes, and a blue bar for the user B for the next 5 minutes by changing the color for each user.

In the above, the editing mode (=recording mode) and playback mode of the text editor 100 proposed in the present inventive concept has been described. The editing mode is a mode for editing the recorded content (write), and the playback mode is a mode for playing the recorded content (read). The playable text editor 100 proposed by the present inventive concept may notify the user in various ways whether the current state is the playback mode or the editing mode.

Figure 3:
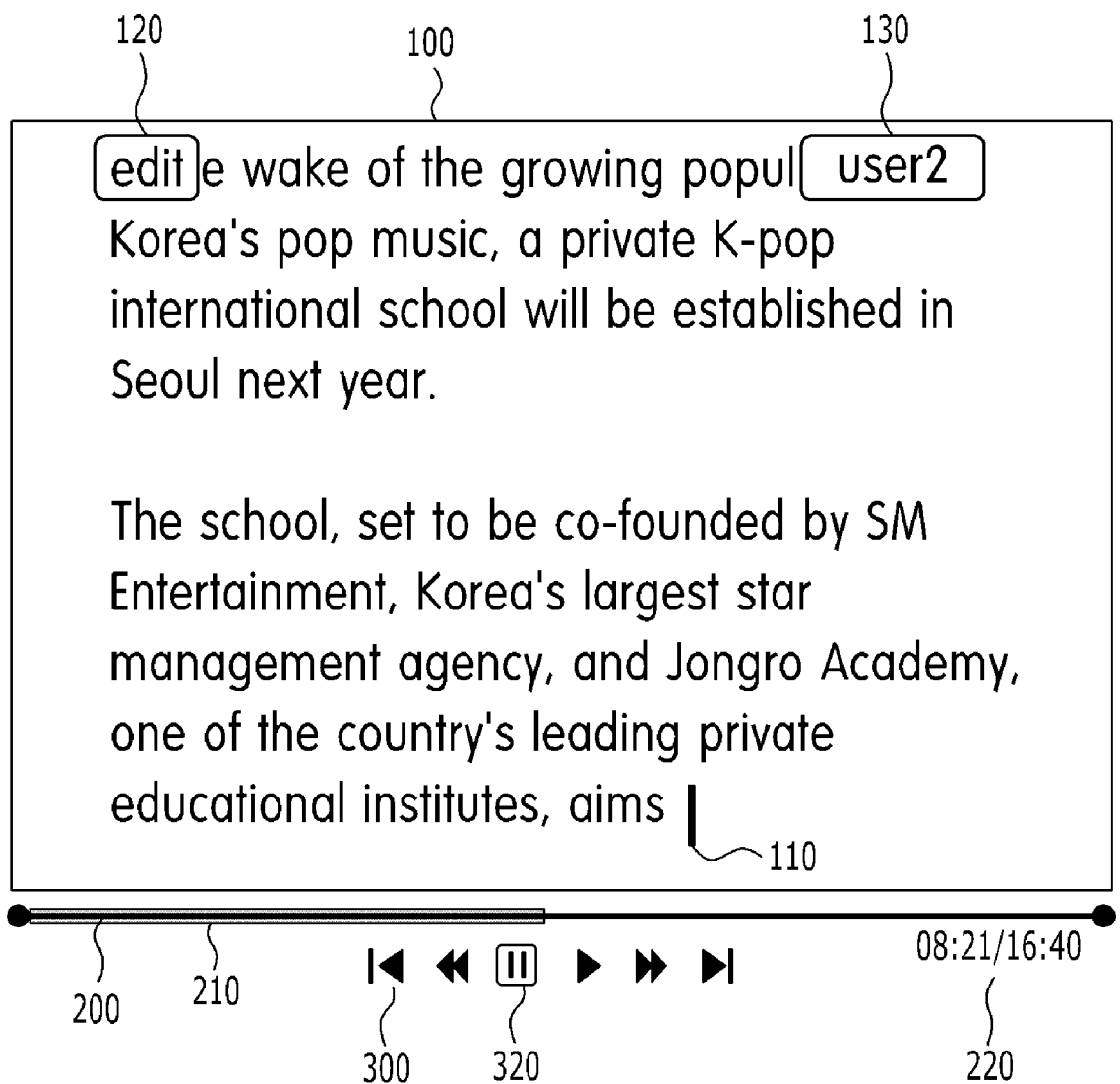

For example, as shown in FIG. 3, mode information 120 for notifying the mode is displayed at the top of an editing window such that information such as edit (or write) may be provided in the editing mode, and information such as play (or read) may be displayed in the playback mode. Alternatively, as shown in FIG. 3, control information 320 that notifies whether it is currently being played or stopped may be displayed on the control bar 300.

In the example of FIG. 3, the control information 320 indicating that the playback of text is stopped is displayed, and this may also be checked through the mode information 120 that notifies the editing mode at the top. On the contrary, in the example of FIG. 4, the control information 320 indicating that the text is being played is displayed, and this may also be checked through the mode information 120 that notifies the playback mode at the top.

Also, referring to FIG. 3, information, a user 2, is notified through the user information 130 to a user who is trying to edit in the current editing mode. On the other hand, referring to FIG. 4, information, a user 1, is notified through the user information 130 to a user who inputs the text being played in the current playback mode. In this way, information on who input the text and who is currently editing may be separately notified through the user information 130.

Figure 4:
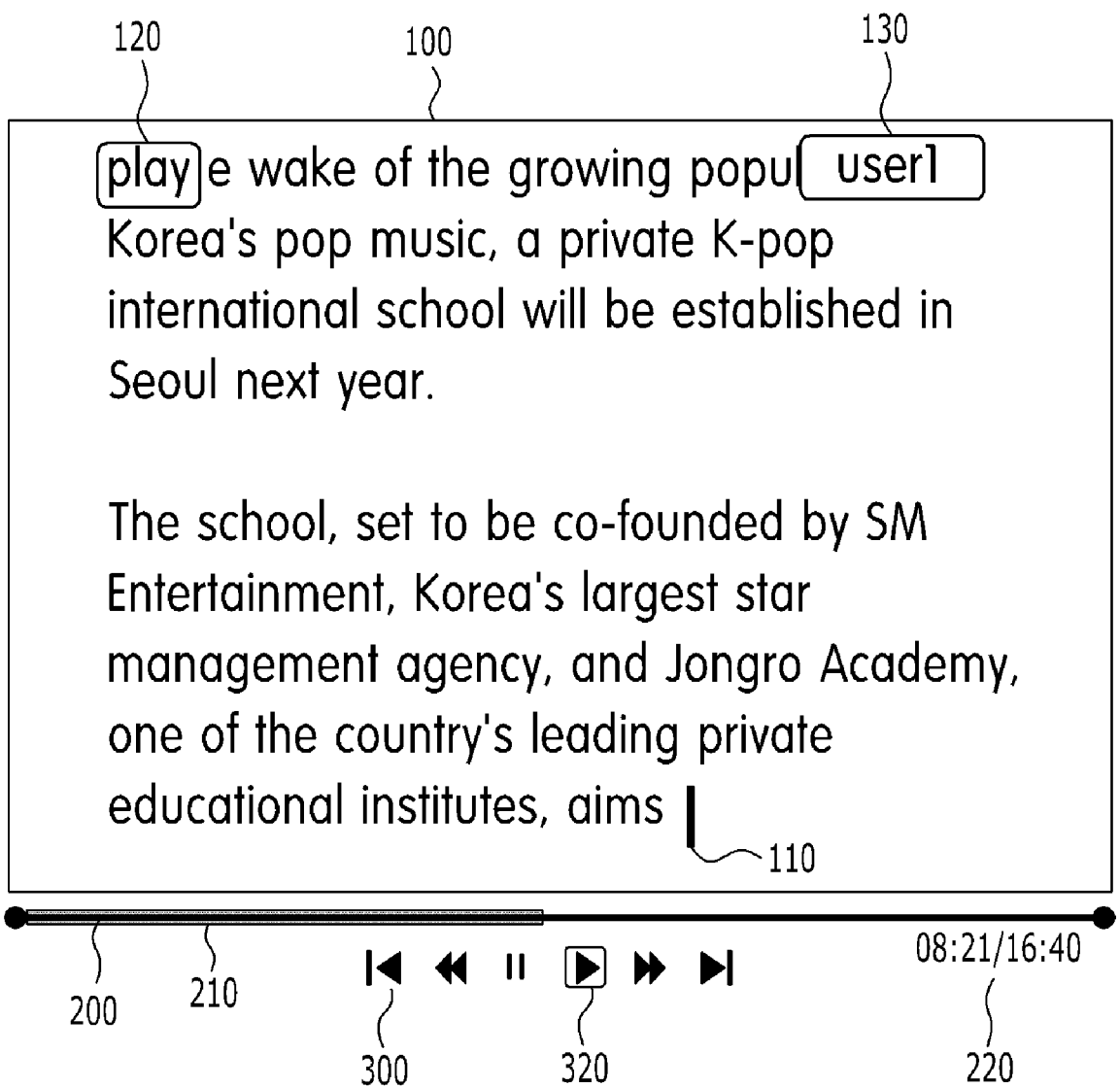

In addition, when the timeline 200 of FIGS. 3 and 4 is checked, all contents of 16 minutes and 40 seconds are displayed in red, and this may notify that it is input by the user 1 displayed in red in the user information 130. If another specific user inputs following the edited contents made by the user 1, the progress status bar 210 may be displayed in a color representing the specific user.

In the editor 100 proposed by the present inventive concept, editing is possible only in a state in which text playback is stopped. In the playback mode, a specific shortcut key, for example, an esc key, may be used to switch to the editing mode. Naturally, in the editing mode, it is possible to switch to the playback mode by inputting a specific shortcut key such as the esc key.

In the editor 100 proposed by the present inventive concept, the playback mode and the editing mode operate mutually exclusively. In the editing mode, it works the same as the general document creation software. However, it differs from the general document creation software in that the input content is recorded as it is over time and the input process is played as it is in the playback mode.

In addition, it is similar to the general video software or music software in that it has the timeline 200 and the control bar 300. However, there is a difference in that the editor 100 proposed in the present inventive concept edits the corresponding content (=text) and manages the version, while the video software or music software may only play content (=video, music).

In addition, the playable text editor 100 proposed in the present inventive concept may play it in a time frame at the time of recording, or may play it depending on a relative time frame. This may be implemented through functions such as fast forward or fast reverse on the control bar 300. Each time the function is selected, it is possible to adjust a time interval at which the text is played at an arbitrary interval such as ×2, ×4, ×8, or ×16 times. In addition, the text input at a specific time may be freely searched by selecting an arbitrary time zone in the timeline 200.

In addition, the playable text editor 100 proposed in the present inventive concept may reproduce a frame every predetermined time based on a frame in which the text is input, rather than playing at the time in which the text was input. For example, suppose the user inputs the text 'a,' the text 'b' after 10 minutes, and the text 'c' after 30 minutes. In this case, the total playback time is 40 minutes, and the number of frames is three. Here, when each frame is set to play in a preset time unit, for example, 5 minutes, the text may be played back in such a way that 'b' is played 5 minutes after 'a' is played, and 'c' is played 5 minutes later. When each frame is played in a constant 5 minute unit, the total playback time is 15 minutes and the number of frames is the same. When each frame is played in a certain time unit like this, even if the actual input interval between the input of text and the next input is longer than necessary, it may be played by shortening it. Therefore, it may improve the user's convenience.

In addition, when each frame is played in a certain time unit, a setting of a unit time for each frame may be changed through a playback speed adjustment functions such as ×2, ×4, ×8, or ×16. For example, assuming a default playback speed is 4 minutes per frame, when it is changed to ×2, it may play every 2 minutes for each frame. When it is changed to ×4, it may play every 1 minute for each frame. In addition, when it is changed to ×8, it may play every 30 seconds for each frame.

As described above, the playback mode of the playable text editor 100 proposed by the present inventive concept and the method for operating the playback mode and the editing mode have been described. Next, a method for managing a version in the editor 100 proposed by the present inventive concept will be described.

FIGS. 5 to 17 are diagrams for explaining a process of managing a version in a playable editor according to an embodiment of the present inventive concept.

Figure 5:
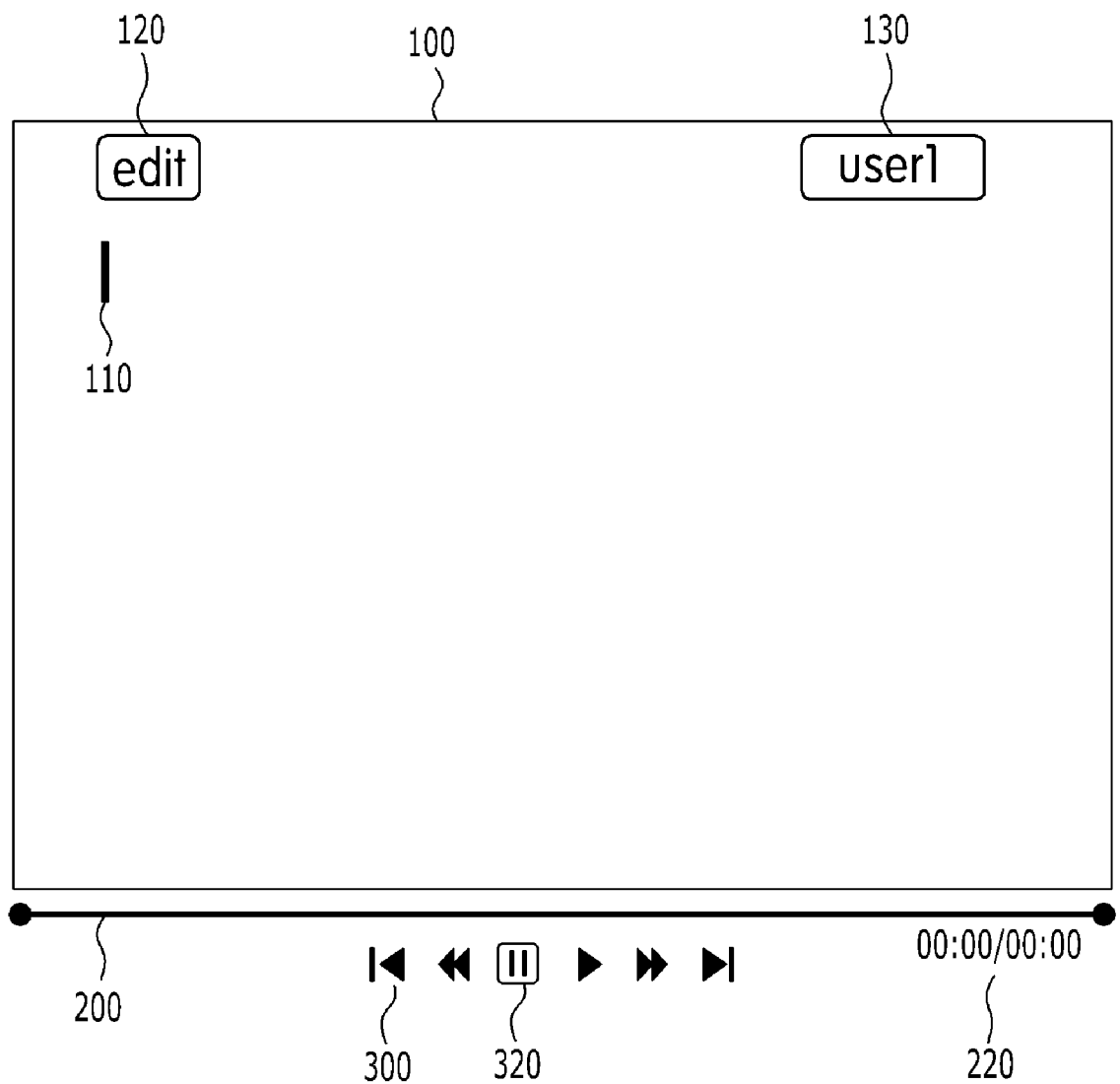
FIGS. 5 to 17 are diagrams for explaining a process of managing a version in a playable editor according to an embodiment of the present inventive concept.

First, referring to FIG. 5, it may be seen that there is no input yet. This may be checked in the content input into the editor 100 or the time information 220 of the control bar 200. If no text has been input yet, of course, the playback mode is not possible and only the editing mode is possible. At this time, if the user 1 inputs the text "Hi." for 10 seconds, the text "Hi." is displayed in an input window and it is possible to switch to the playback mode, as shown in FIG. 6.

Figure 6:
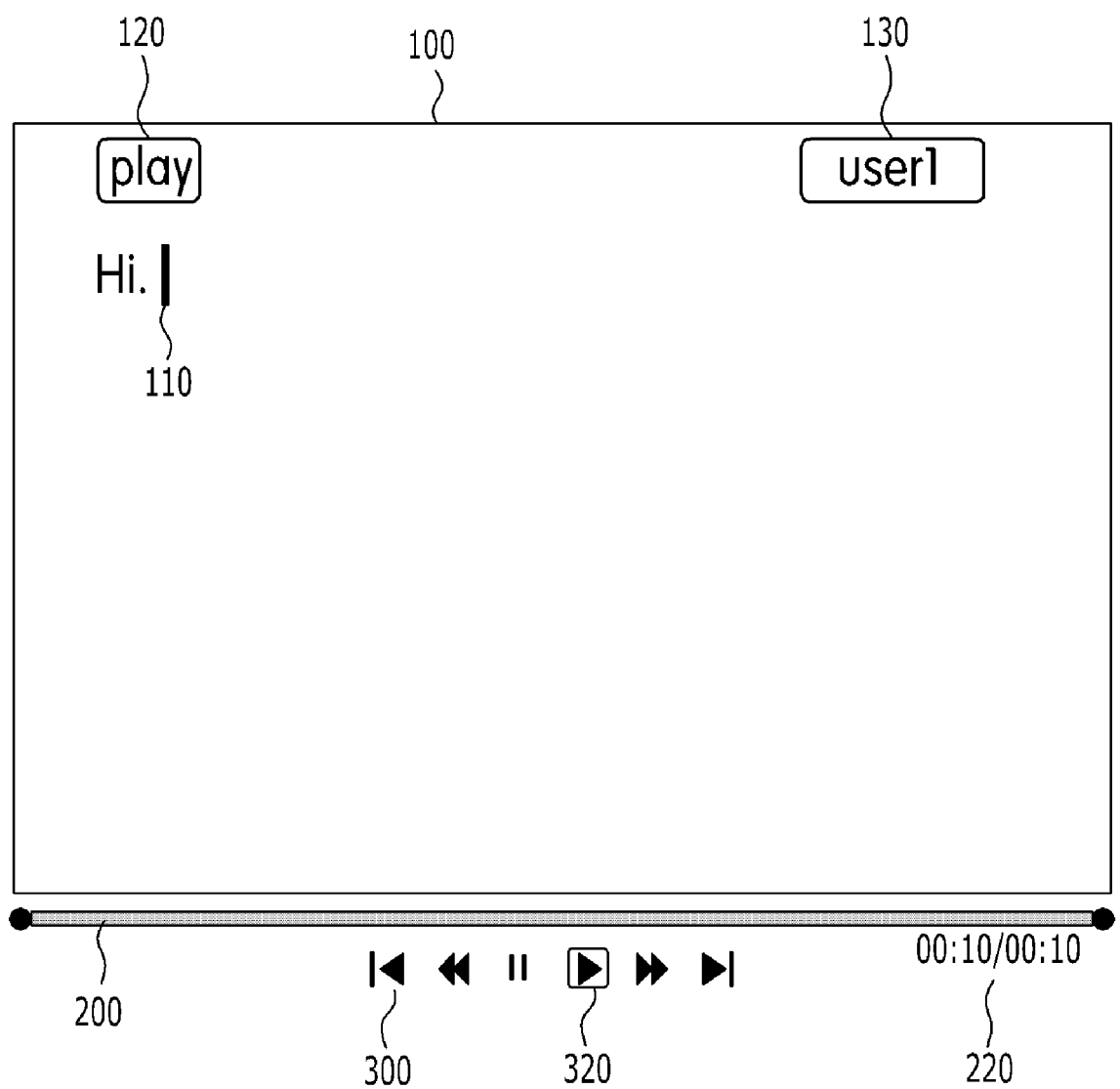

Referring to FIG. 6, all of the timeline 200 is displayed in red, which is a color for the user 1. Therefore, it may be seen that all user input for 10 seconds was input by the user 1. In addition, referring to the progress status bar 210 and the time information 220, it may be seen that all the content input for 10 seconds has been played. When the content is all played and changed to the editing mode, input content in a new editing mode is saved after the end of the previous text, and the timeline 200 is also increased by the time required for text input in the new editing mode.

For example, suppose that in the situation where the text "Hi." is input as shown in FIG. 6, the user 2 additionally inputs the text "My name is bread." on the next line for 15 seconds. Then, the total playback time is 25 seconds in total, 10 seconds for the user 1 to input "Hi." and 15 seconds for the user 2 to input "My name is bread." In addition, the timeline 200 is divided into colors representing each user and may be displayed.

Figure 7:
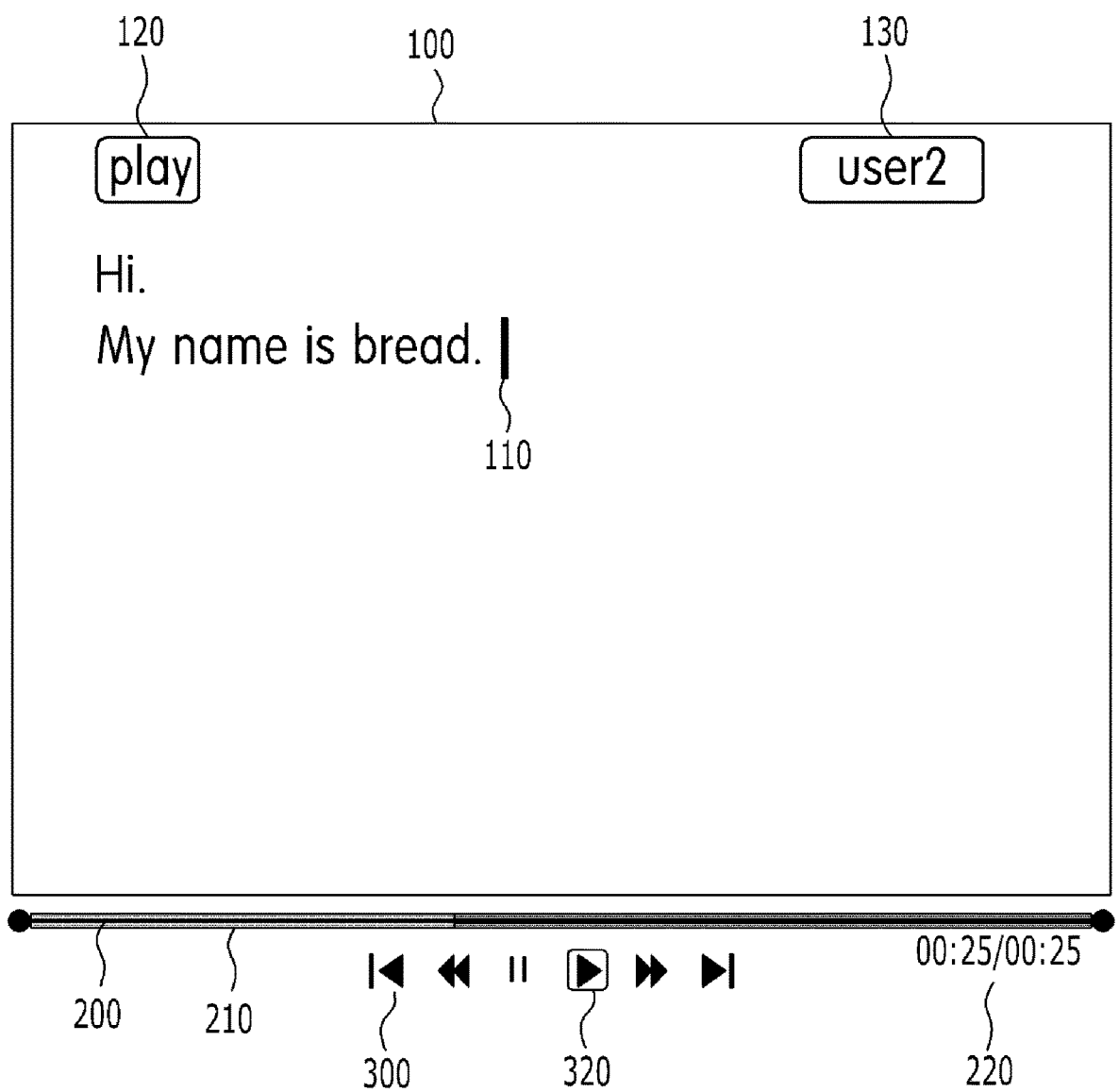

Referring to FIG. 7, for the entire text, "Hi. My name is bread." is displayed in the input window, and the time information 220 is 00:25/00:25 and is notifying that all contents input for 25 seconds was played. Also, even if the progress status bar 210 is referred to, it may be seen that a gray bar bars have all moved up to 25 seconds. Here, it may be seen that the timeline 200 is displayed in red indicating the user 1 from 0 to 10 seconds, and is displayed in blue representing the user 2 from 10 to 25 seconds.

Figure 8:
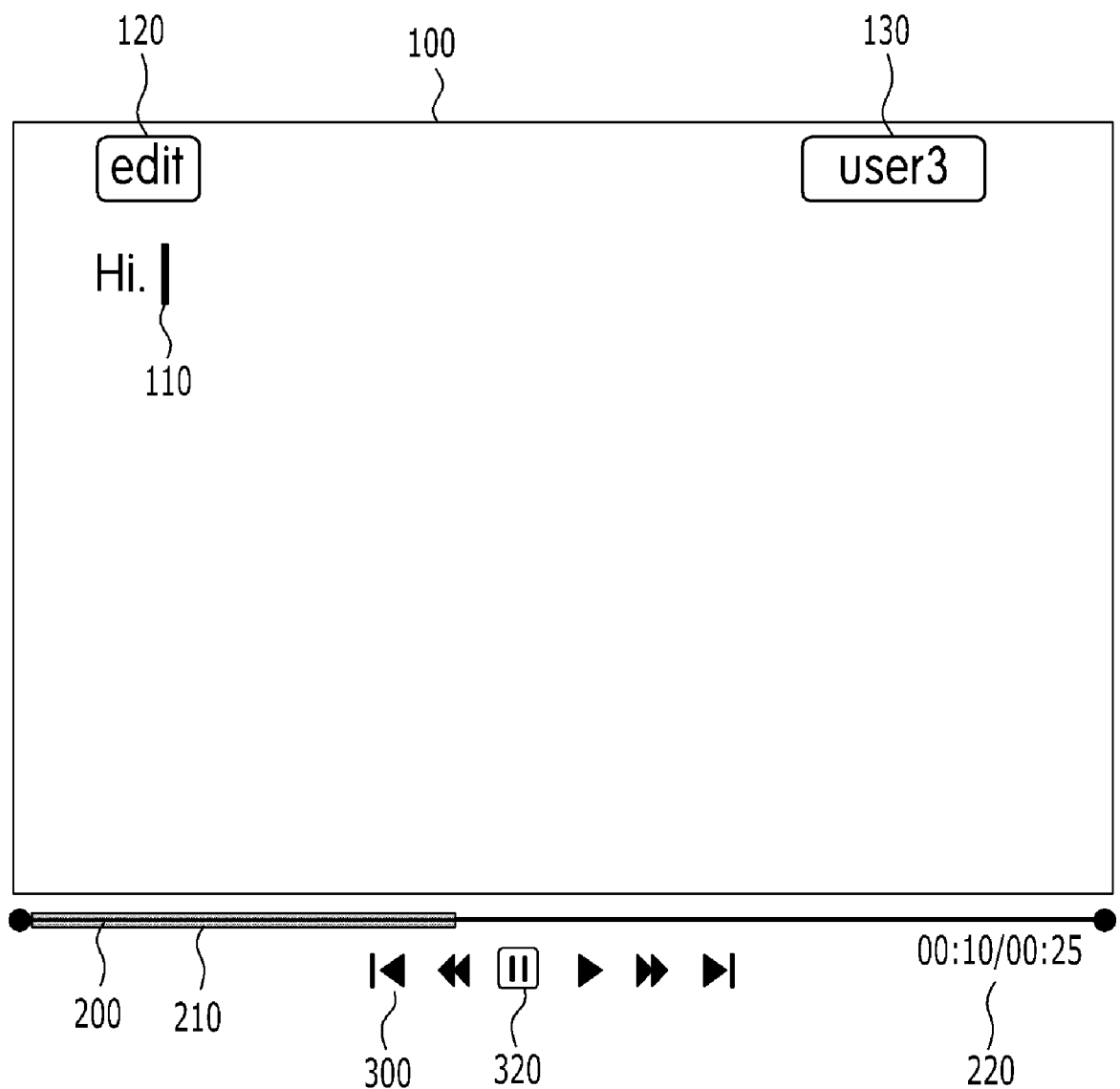

Suppose a user 3 edits a playable text file created in this way. Here, suppose the user 3 does not edit after 25 seconds of all text being played, but edits the text after moving to the 10 seconds where the user 1 inputs it. Then, as shown in FIG. 8, it may be seen that, in the timeline 200, in a situation of up to 10 seconds edited by the user 1 out of 25 seconds, that is, until a red timeline is played, the user 3 stops the playback 320 and is switched to the editing mode 120.

The user information 130 notifies that the user who is currently editing is the user 3. In addition, it may be seen that the text played only up to "Hi." input by the user 1, and the text "My name is bread." input by the user 2 has not been played yet.

In this state, if the user 3 enters the sentence "Nice to meet you." for 20 seconds, the content input by the user 3 is placed between the text "Hi." input by the user 1 for 10 seconds and "My name is bread." input by the user 2 for 15 seconds. In addition, it also occupies 10 to 30 seconds out of 45 seconds of total playback time in the timeline 200.

Figure 9:
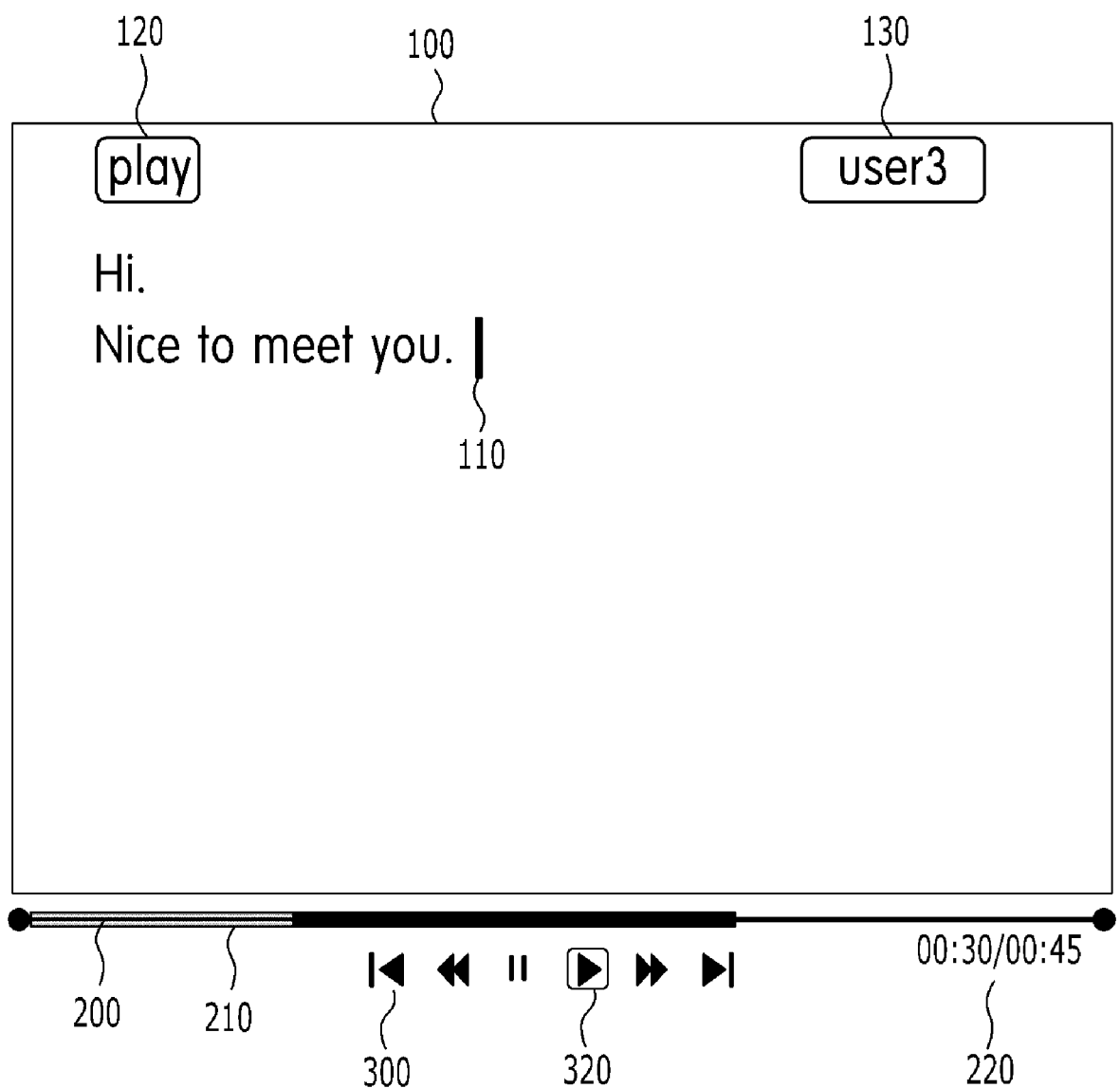

Referring to FIG. 9, it may be seen that after the user 3's editing was completed, a portion corresponding to 30 seconds was played from the playable text of 45 seconds. At this time, the text "Hi." input by the user 1 for 10 seconds and the text "Nice to meet you." input by the user 3 for 20 seconds were played, and the text "My name is bread." input by the user2 for 15 seconds has not been played yet.

Figure 10:
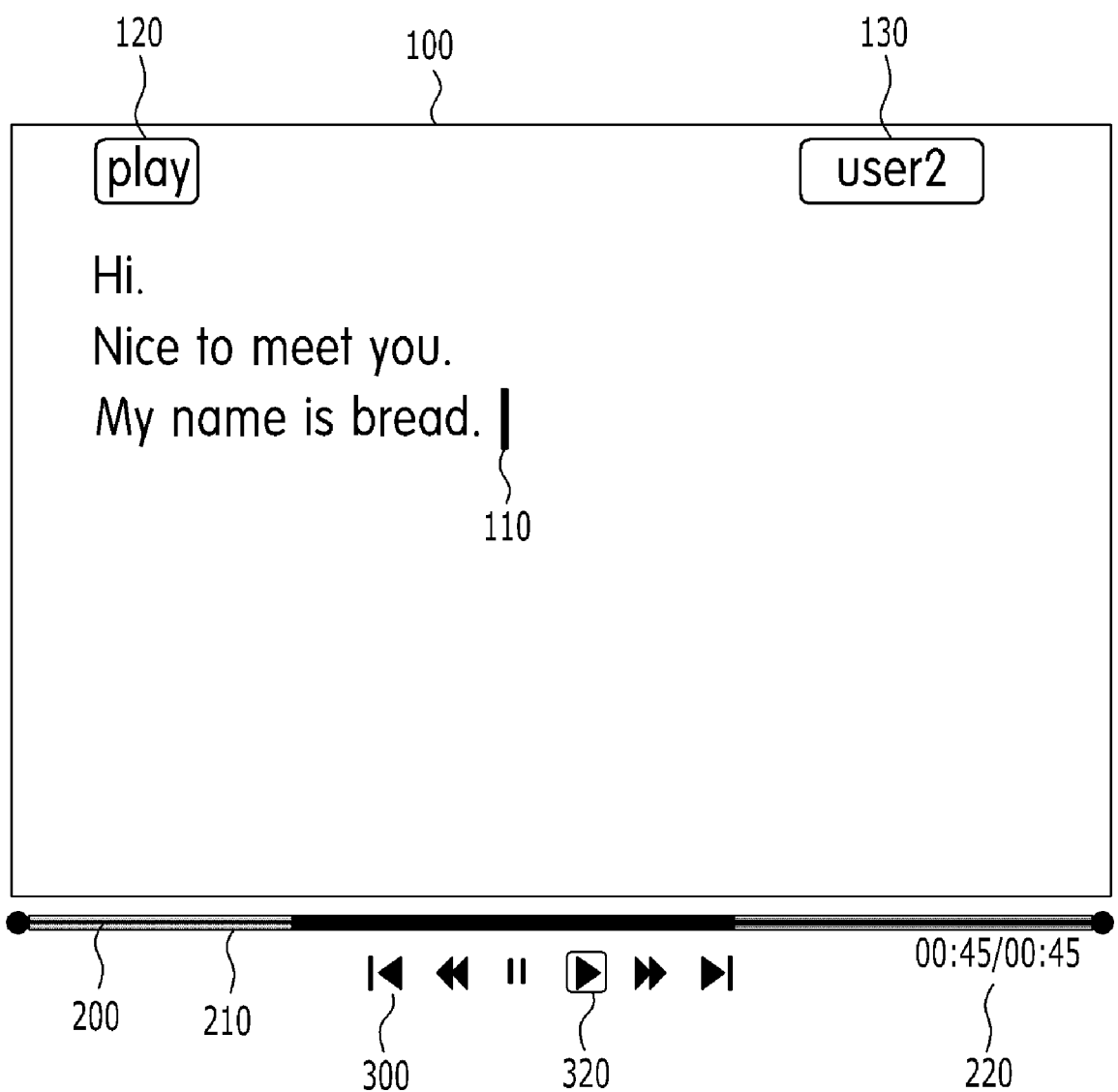

Next, referring to FIG. 10, it may be seen that after the text input by the user 3 is played, the text input by the user 2 is played. The text "My name is bread." that was most recently played through the user information 130 notifies that the user 2 has input it, and this may be confirmed through the color of the timeline 200.

As may be seen through FIGS. 5 to 10, when editing by one user or multiple users, a location where the edited content is to be reflected is determined according to a time point of the timeline 200 where editing is started. When all contents are played, then it is switched to the editing mode, and the text is input as shown in FIG. 7, it is recorded in such a way that the input text is added following the previous content. On the other hand, when switching to the editing mode and entering the text while playing a specific content as shown in FIG. 8, recording is performed in such a way that the input text is inserted between the texts before and after switching to the editing mode.

Naturally, in addition to the case where the version is managed in such a way that the text is inserted or added within one version as described in FIGS. 5 to 10, it is also possible to insert or add text within multiple versions. Suppose, as in FIG. 8, that the user 3 edits at the 10 second point between the text input of the user 1 and the text input of the user 2. However, this time, suppose that the user 3 edits while adding a new version unlike FIG. 8.

Figure 11:
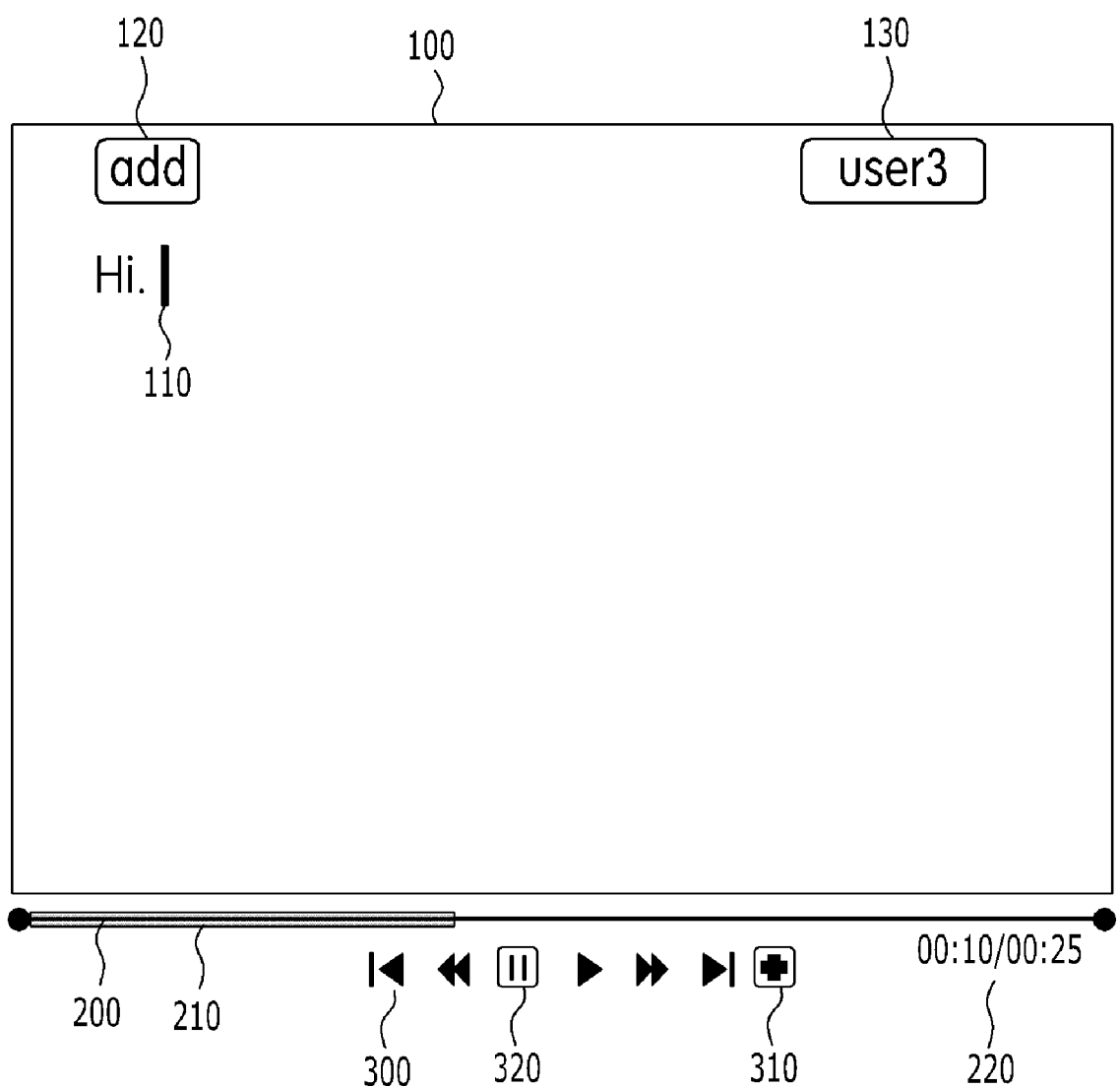

Then, as shown in FIG. 11, it may be seen that the user 3 has selected a version management function 310 for adding a new version. The user 3 may set the editing mode 310 for adding a new version at the same time while switching to the state where the playback is stopped, i.e., the editing mode 320. In some cases, the mode information 120 also displays "add" instead of "edit" to notify that the currently input content is added as a new version.

Suppose the user 3 input the text "Nice to meet you." for 20 seconds in the editing mode for adding a new version. Then, the content input this time is managed as a separate version from the text "My name is bread." input by user 2. In other words, a first version where the text "Hi." input by the user 1 is played followed by the text "My name is bread." input by the user 2 and a second version where the text "Nice to meet you." input by the user 3 is played after the text "Hi." input by the user 1 exist simultaneously.

Figure 12:
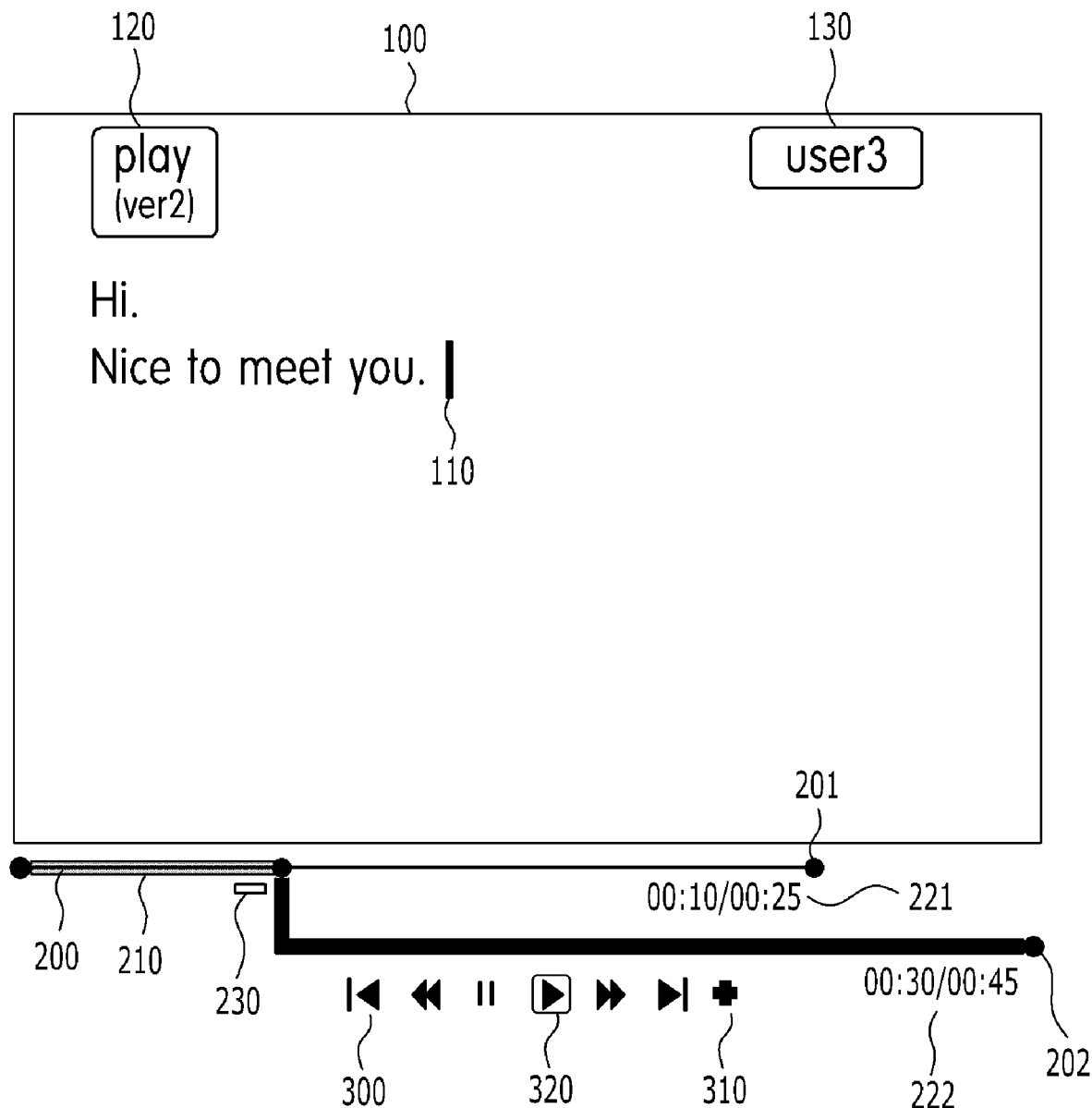

Referring to FIG. 12, the timeline 200 where two versions exist may be seen. In the first version in which the text input by the user 2 is added to the text input by the user 1, the total playback time is 25 seconds 221, and this may be confirmed through a first timeline 201 branched from the timeline 200. In addition, in the second version in which the text input by the user 3 is added to the text input by the user 1, the total playback time is 30 seconds 222, and this may be confirmed through a second timeline 202 branched from the timeline 200.

Currently, the text of the second timeline is being played, and this may also be confirmed by displaying Play (ver2) in the mode information 120. It may be confirmed that, in the timeline 200, the progress status bar 210 progresses along the second version at a branch of the first version and the second version. In addition, the difference in the total playback time of each version may also be confirmed through the difference in length between the first timeline 201 and the second timeline 202.

Figure 13:
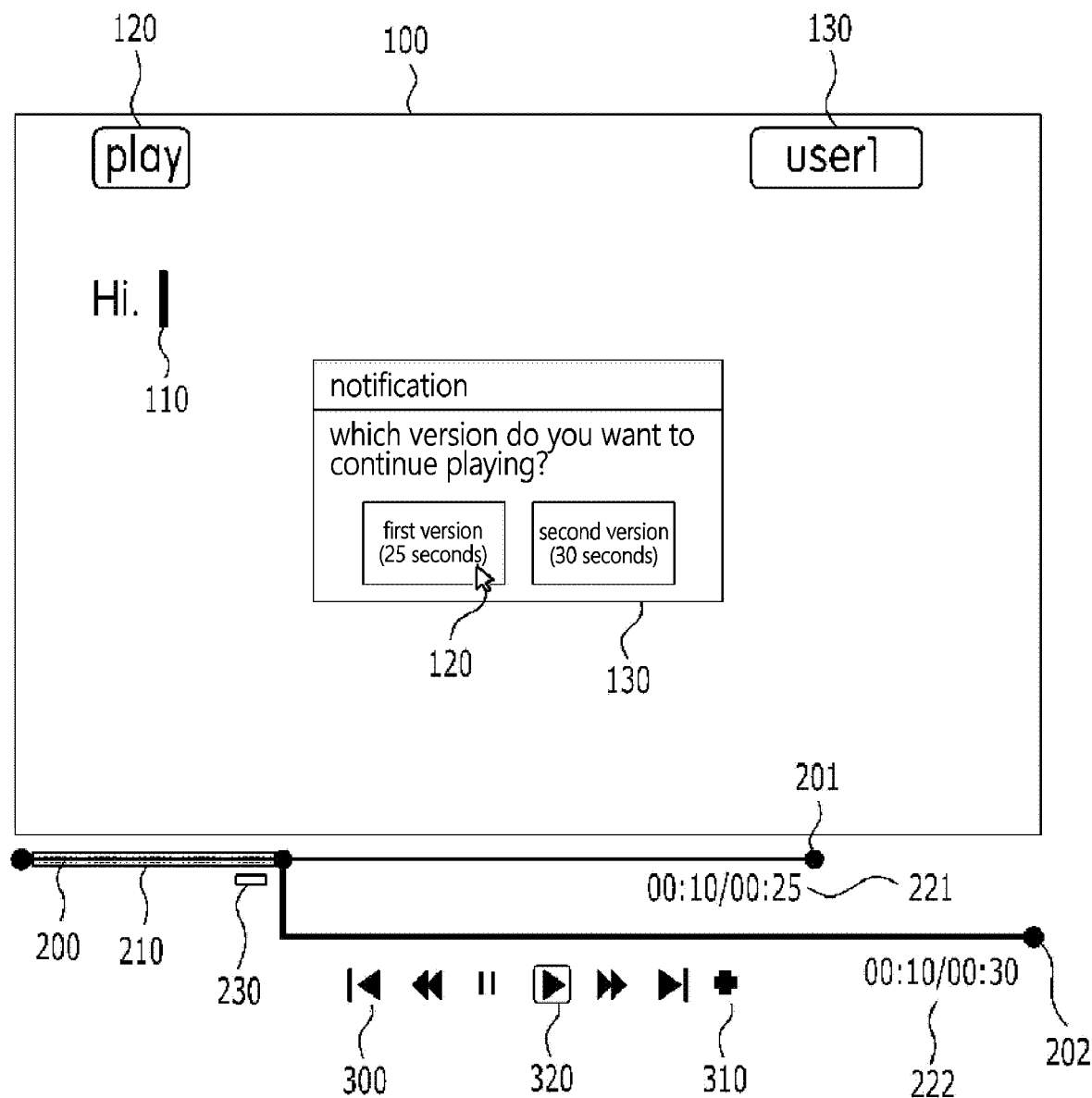

If it plays the text with two versions in the first place, the playback is performed as it is until 10 seconds corresponding to the branch point, and then a user interface (GUI) may be provided to receive user input as to which version to continue playing at a point of 10 seconds. Referring to FIG. 13, it may be seen that if it meets the branch in the state of being played up to 10 seconds, a pop-up layer 130 for asking the user which version to play is displayed. Here, when the user selects to play the first version using a mouse pointer 120, the playback continues as shown in FIG. 14.

Figure 14:
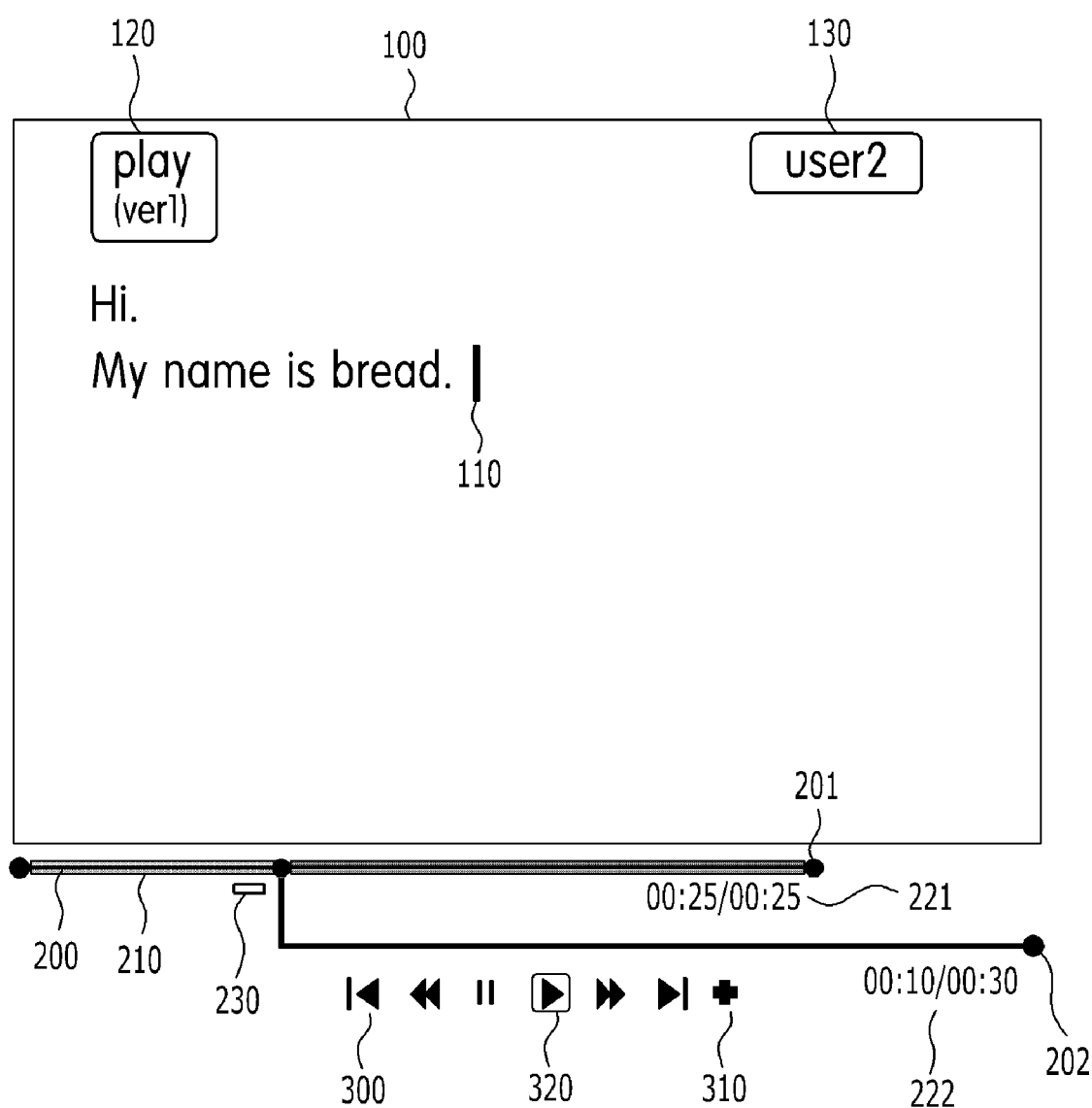

Referring to FIG. 14, unlike the case of FIG. 12, it may be confirmed that the first version is being played, through the mode information 120, and it may be seen that the progress status bar 210 has moved to the end of the first timeline 201, through the timeline 200. Also, through the user information 130, it may be confirmed that the last part of the first version is input by the user 2.

Figure 15:
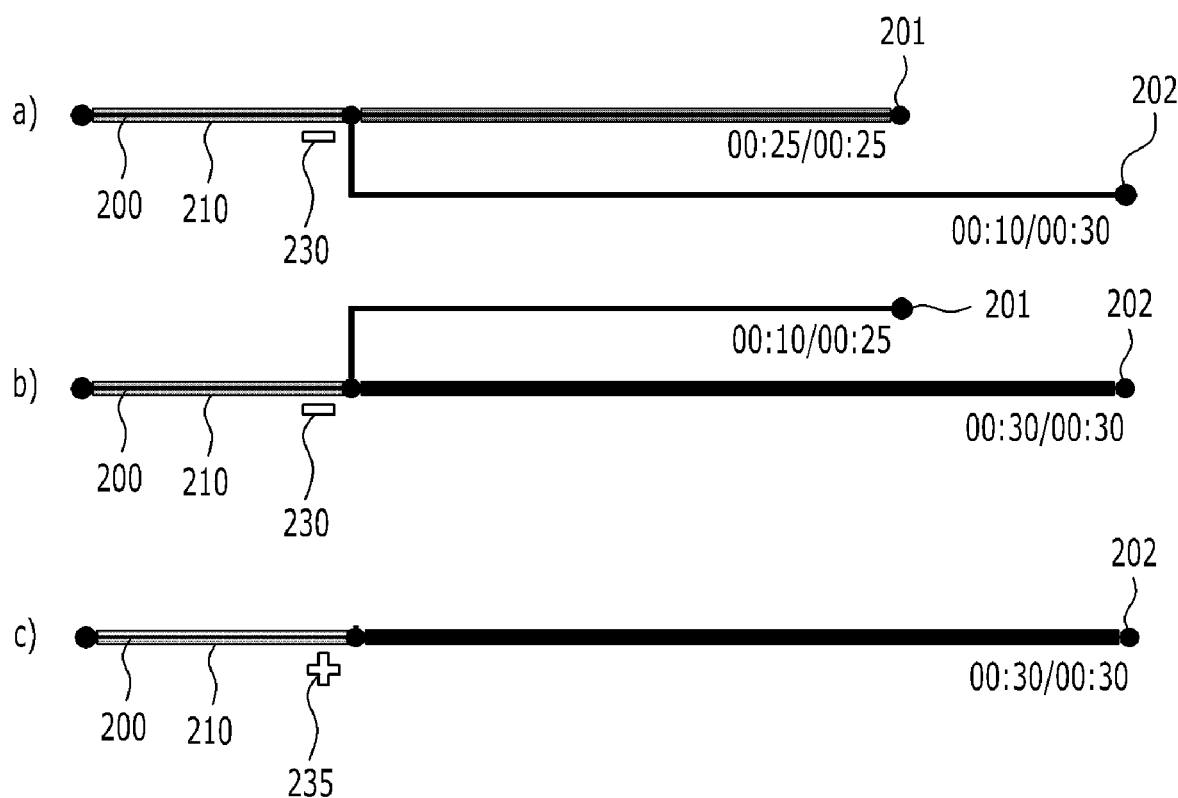

When there are several branch points in the timeline 200 as shown in FIGS. 12 to 14, in addition to decide what timeline to play by the user's input, the timeline to be played may be visually provided by the concepts of a main timeline and a sub-timeline. Referring to FIG. 15, it is illustrated in three forms of the timeline 200. In the case of a), the first timeline 201 is the main timeline. In the case of b) and c), the second timeline 202 is the main timeline.

The main timeline is a timeline that is currently being played or edited, and is expressed in a straight line. Alternatively, the main timeline may be represented by a thick line compared to the sub-timeline. In contrast, a timeline other than the main timeline is called a sub-timeline, and the sub-timeline may be shown in the form of branches. When the user selects a specific timeline to play or edit, the timeline is changed to the main timeline.

Here, the time line may be sorted according to the created order. Alternatively, it may be sorted by the total playback time of the timeline. Here, the total playback time basically means the actual time the text is input. In addition, when each frame with text input is played in a certain time unit, the timeline may be sorted up and down accordingly because the playback time is determined according to the total amount of input text. In the example of FIG. 15, the first timeline 201 was created earlier than the second timeline 202. Therefore, it may be seen that in any case a, b or c, the first timeline 201 is positioned above the second timeline 202.

In the case of a, the first timeline 201 is the main timeline, and the second timeline 202 corresponds to the sub-timeline. In this case, as shown in FIG. 13, the main timeline may be mainly played without needing to receive user input as to which version to play. In the case of b in FIG. 15, the first timeline 201 is the sub-timeline, and the second timeline 202 is the main timeline.

The sub-timelines other than the main timeline are shown in the form of branches in the main timeline. The branches of the sub-timelines may be illustrated in a form of folding or unfolding through a + button 235 and a – button 230. In the case of c in FIG. 15, the first timeline 201 which is the sub-timeline is folded. In this case, the + button 235 may be displayed at a branch point of the branch. In this case, when the user selects the + button 235 in the case of c, the timeline 200 may be displayed in the case of b. Conversely, when the user selects the – button 230 in the case of b, the timeline 200 may be displayed in the case of c.

When the timeline is visually expressed as the main timeline and the sub-timeline as shown in FIG. 15, a position of the timeline may be continuously changed. Therefore, in addition to these marks, it is possible to fix the position of the timeline, receive user input which timeline to be played as shown in FIGS. 13 to 14, and indicate which timeline is being played through the progress status bar 210.

In this way, the playable editor 100 proposed in the present inventive concept may manage multiple versions, and this may be visually provided as a branched timeline. The user may search by selecting a specific time zone of each timeline. Accordingly, one may easily create and delete a recorded history of change as a version. It is also possible to search, merge, or share the history of change with other users.

A process of managing a version in the editor proposed by the present inventive concept is summarized as follows. First, when recording is started for the first time, a new version is automatically created and changed contents are recorded in the corresponding version (FIGS. 5 to 6). When a new editing mode edits the content immediately after the very last part without a search process (movement of the control bar), it is automatically added to the version being created (FIG. 7). However, if the content is changed from the middle point of the original after the search process, new temporary version data is created at the point where the change is started (FIGS. 8 and 11). Subsequent input content is regarded as a temporary version and is retained until moved back to the current version. The temporary version may be reflected in the current version or may be reflected in the new version. When it is reflected in the current version, the content is added at the time when editing is started. In this case, the total playback time of the current version is increased (FIGS. 9 to 10). If the input content is reflected in the new version, a new branch point is created at the time when editing is started, and the timeline 200 is separated with respect to the branch point (FIGS. 12 to 15).

Naturally, the contents input by the user may be deleted without being reflected in a specific version in a temporary storage state. In other words, the recorded history of change is automatically saved temporarily. If one wants to keep this permanent, one may reflect the temporarily saved content in a specific version. Also, if a specific version is no longer needed, the version may be deleted. The deleted version cannot be recovered. However, at least one version must remain.

In the editing mode, it is possible to freely change the current version. The current version is maintained until one explicitly changes the version. Playback or editing is only possible within the current version. When the version is changed, similarly, only the content corresponding to the changed version may be played or edited. In order to move to another version, it is sufficient to select the timelines 201 and 202 of different versions in the timeline 200. This was described in detail in the description of the main timeline and sub-time of FIG. 15 above.

Each version has a summary of the changed contents that characterize the version. By showing summary information when changing a version, it may help one choose the version that contains desired information. For example, as in FIG. 16, when the user moves the mouse pointer 120 over the timeline 200, summary information 140 for the corresponding timeline 200 may be provided as a pop-up layer on the top. The summary information may include a playback time for each user.

Naturally, if various information on the version includes a common history even if it is a separate version, multiple versions may be merged as one version based on a common part. In other words, if there is a part in which the history of the current version and the version to be shared are common, history of change may be merged based on a common part. To this end, referring to the bottom of FIG. 17, it may be seen that a function 315 for merging the first version and the second version is added. When the user selects the merge function, the input window may be divided into two to display contents of each and compare the differences.

Figure 16:
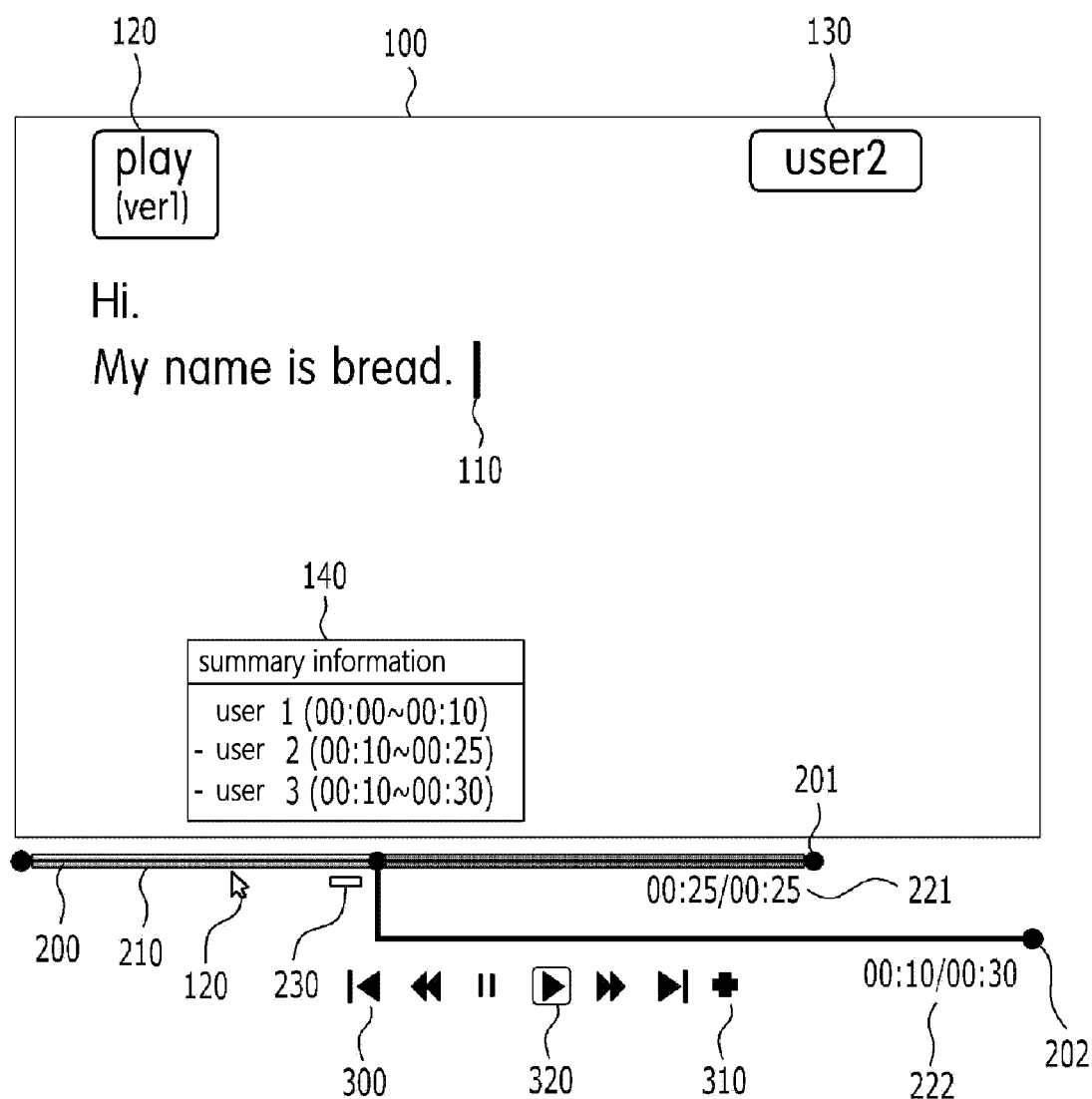
Figure 17:
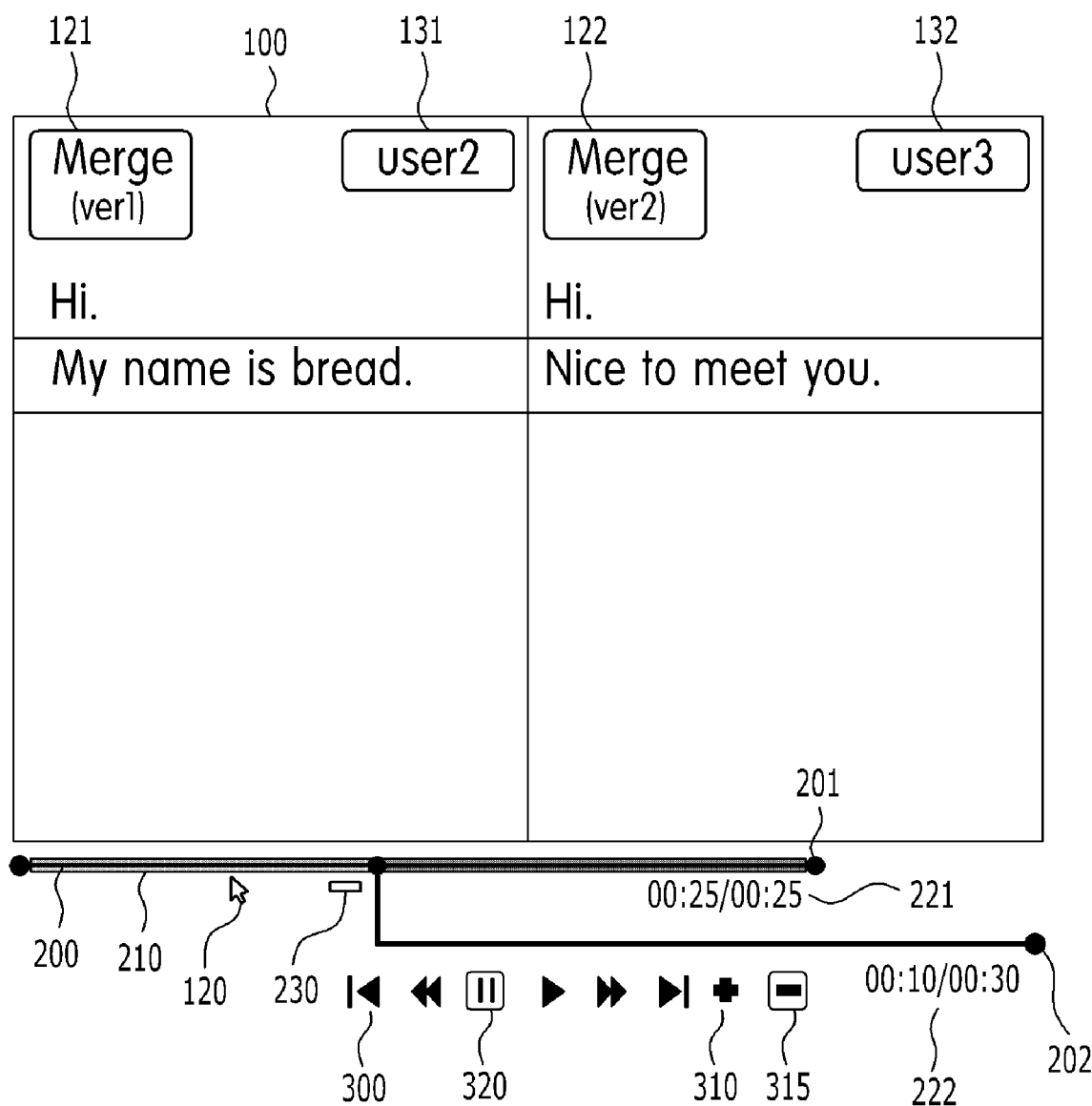

In FIG. 17, the input window is divided into two screens, in which it may be seen that the first version in which the content input by the user 2 is added to the content input by the user 1 is shown in a left screen, and the second version in which the content input by the user 3 is added to the content input by the user 1 is shown in a right screen. Also, it may be confirmed that it is currently the merge mode through the respective mode information 121 and 122. In addition, it is possible to visually notify the user to see which part is different in each version. In FIG. 16, it may be seen that the content input by the user 2 is marked with a blue block, and the content input by the user 3 is marked with a green block.

Here, in the case of the user merges two versions, when it is merged in order in which the content input by the user 1 is played, next, the content input by the user 3 is played, and then, the content input by the user 2 is played, the timeline 200 may be arranged in the form shown in FIG. 10. Naturally, alternatively, it may be merged in order in which the content input by the user 1 is played, next, the content input by the user 2 is played, and then, the content input by the user 3 is played.

Also, the merge mode may be played. Therefore, when the current position moves back and forth, the first version and the second version may show different text. For example, if the first version is abc+d+e+f, and the second version uses abc in common and plays after h+i+j, it is split into two when in the merge mode. In this case, the two timelines that one wants to merge with each other are highlighted. When the current position of the timeline moves, def and hij are added to the two divided screens, respectively, and the typing process is played, and different parts (d and h, de and hi, def and hij) may be displayed on a screen every frame.

In addition, the merging between versions described in the present inventive concept is possible not only merging when multiple versions exist in one file, but also merging multiple versions in different files. However, in order to merge versions existing in different files, the same text must be shared in each file. Then, up to the same text exists as one timeline, and different texts may be merged in the form of branches.

For example, suppose that a user A, a teacher, created a text pte file with a problem and shared it with a user B and a user C. The user B and the user C then follow the problem and input their own solutions, which exist as timelines within each file. While students solve the problem, the teacher also enters the correct answer in the file he/she created. Then, when the students submit their answers to the teacher in the form of a file, the teacher may merge a text file 1 with the correct answer, a text file 2 submitted by the user B, and a text file 3 submitted by the user C into one file. This is because all three files have the same text of the problem. When these three files are merged, one file is created and the timeline is created with three branches. The branch point is a point in time at which the input of the problem ends, and each solving part is on a separate timeline.

In the playable text editor proposed by the present inventive concept, each text pte file acts as a repository. Here, the text pte file may include several sub-files (a.txt, b.txt, c.txt, etc.). In other words, in the playable text editor, it is possible to edit while switching different sub-files. When playing it, the process of changing the sub-file may also be played.

Even if they are different repositories, i.e., even if they are different files, when there is a common text timeline, multiple files may be merged based on this. In other words, the text editor proposed in the present inventive concept may merge not only the timeline but also the repository. Different users A, B, and C have worked in different workspaces, but may share (deliver) their versions in different workspaces based on common text. Therefore, this ability to merge files may be particularly useful in collaboration. In other words, when several people are working on a joint project, the work efficiency may be further improved through a file merging (=repository merging) function and a timeline merging (version merging) function in a process of bringing the output together.

As described above, the method for editing and the method for managing the version of the playable editor proposed in the present inventive concept have been described. In particular, in the present inventive concept, it is possible to change the playback mode and the editing mode. Here, the history of change of the created text may be managed as a version, which is presented to the user intuitively in the form of the branch of the timeline.

When the timeline 200 is described in more detail, one version of the timeline 200 is represented as one branch. The current version, i.e., the main timeline, may always be positioned in the center of the bar of the timeline 200. The current version is a collection of fragments of different versions, and the timeline may intuitively display them with colors, etc. Also, at the branch point of the branch, the branch may be folded or unfolded through the + and − signs. When the branch is folded, the timeline of the other version is hidden, and when the branch is opened, the timeline of the other version may be checked. Also, the top and bottom layout of the timeline may be sorted based on when each version was created. For example, when the second version is created later than the first version, the timeline of the second version may be arranged below the timeline of the first version. In addition, commands such as normal playback or creating a new version are only available for the current version. To play or add a version from another version, the version must be selected. This may be done by selecting a different version of the timeline and playing it or switching to the editing mode.

Referring to FIG. 15, it may be seen that the − button 230 for folding and unfolding the two versions of branches is displayed on the branch point portion of the timeline 200. In FIG. 15, the first version is currently being played. Therefore, when the user selects the − button 230, the second timeline 202 disappears from the screen and the − button is replaced with the + button 235 instead. When the user selects the + button 235 near 10 seconds, the second timeline 202 may be displayed again as shown in FIG. 15. Accordingly, even if there are multiple versions, the timeline 200 may be clearly visualized and provided to the user.

Figure 18:
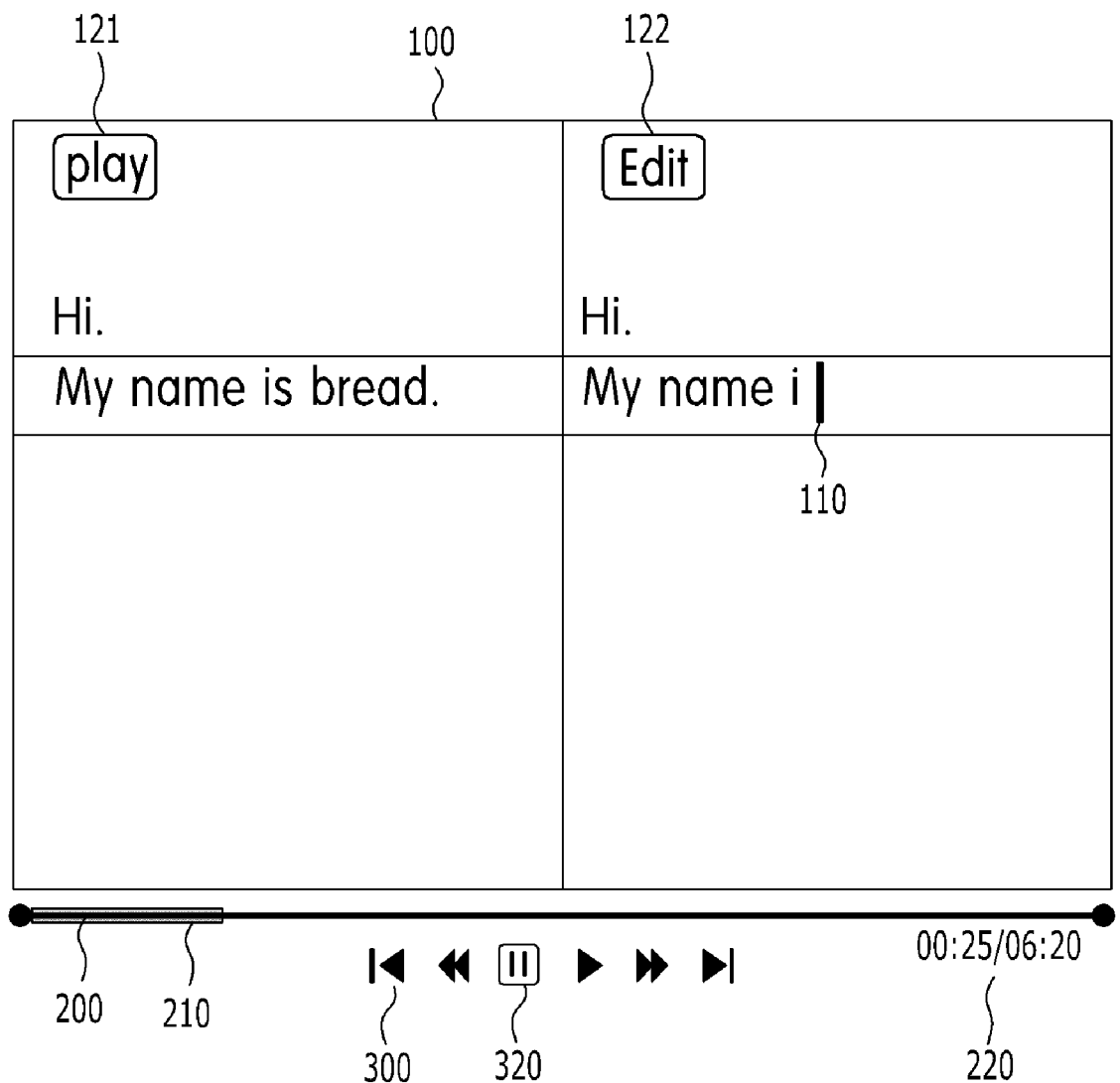
FIGS. 18 to 19 are diagrams for explaining a method for utilizing a playable editor according to an embodiment of the present inventive concept.
Figure 19:
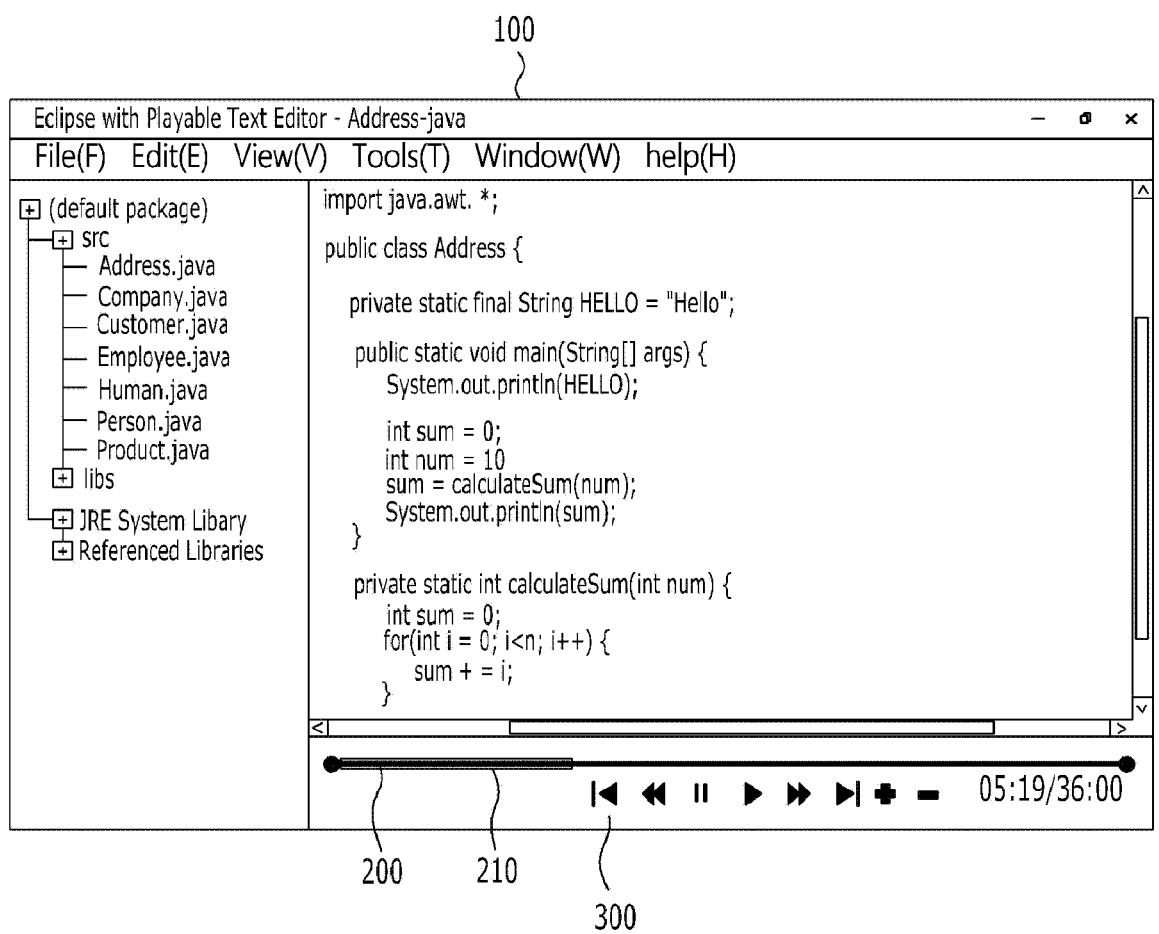

FIGS. 18 to 19 are diagrams for explaining a method for utilizing a playable editor according to an embodiment of the present inventive concept.

The playable editor proposed by the present inventive concept may be implemented by itself as the document creation software. In addition, it may be added as an add-on to existing document creation software to provide an input content record/playback function and a version control function. In particular, the present inventive concept may exert a great effect in the field where the text input process is important. For example, it may be useful in the field of learning.

Referring to FIG. 18, it may be seen that the editor 100 proposed in the present inventive concept is divided into two screens. Text to be learned is played on the left screen, and text directly input by a learner is displayed on the right. Referring to FIG. 18, currently, the text "Hi. My name is bread." has been played for learning, and the text has been played for 25 seconds. In this way, the user may perform learning by viewing the text being played in the left area and typing the same text in the right area.

Here, the text on the left proceeds only in the playback mode 121, and it may be played by breaking it up in regular units. For example, when the text "Hi. My name is bread." is followed by the text "Nice to meet you," first, playback is stopped while only "Hi. My name is bread." is displayed. Then, if the user enters the same text, again, the rest of the text "Nice to meet you." may be played for learning. This is called a "dictation mode." The playable editor 100 may provide a learning function in a similar manner in which the teacher speaks a sentence, and the student receives it and enters it, and then the teacher speaks the next sentence. Alternatively, the learning may be performed in a manner in which the student first enters a sentence in the right area, and then, one sentence is displayed in the left area. In this case, the learning may be possible by checking whether content input by the learner is correct. This is called a "write-first" mode.

When the playable editor 100 is used in this way, a large learning effect may be obtained in a field in which the text input process is important. For example, it may be very effective in fields related to grammar or writing. Alternatively, it may be useful for learning mathematics. As described above, the text editor of the present inventive concept may record not only keyboard input but also touch screen input. If the process of solving a math problem is recorded in frame units, the learning effect may be improved compared to simply providing an answer to the math problem.

Alternatively, the editor may be used in a process of learning how to program. For example, the editor proposed in the present inventive concept may be added as an add-on to existing programming software such as Eclipse or Visual Studio. By this, the user may effectively perform learning by using software used for programming.

FIG. 19 shows a user screen (GUI) of Eclipse, which is a programming integrated development environment supporting various languages including Java. Source of a package may be searched through a tree menu on the left, and the source may be edited through an editing area on the right. It may be seen that the editor proposed in the present inventive concept is added in the form of an add-on, and provides the timeline 200 and the control bar 300 together with editing of source code.

As such, the playable editor may be used to learn programming. In addition, collaboration is easier because multiple users may work together to track the history of change over time when developing software. In addition, since the version related to the history of change is provided in the form of the timeline 200, modifications of the source code may be more intuitively checked.

In particular, if the playable editor proposed in the present inventive concept is used in a programming learning process, source code to be learned and source code input by the user may be divided and provided on a screen of the editor, as in FIG. 18. In addition, the similarity of algorithms of each source code may be calculated and provided, and a result of executing each source code may be compared and provided. Therefore, not only the comparison of the source code but also the comparison of the execution result may be provided to increase the effectiveness of programming learning.

Figure 20:
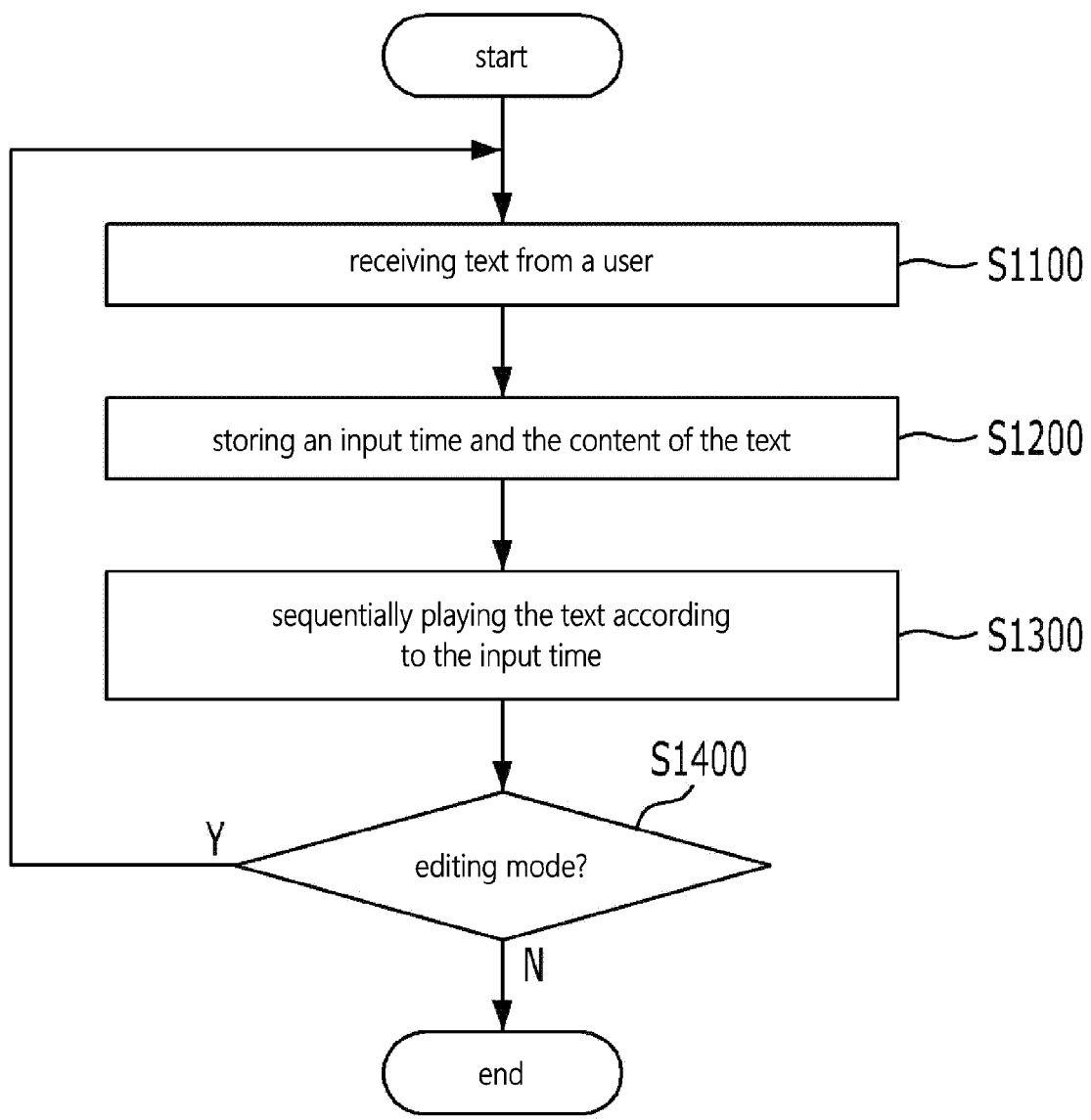
FIG. 20 is a flow chart for explaining a method for editing text using a playable text editor according to an embodiment of the present inventive concept.

FIG. 20 is a flow chart for explaining a method for editing text using a playable text editor according to an embodiment of the present inventive concept.

Referring to FIG. 20, first, text is input from a user (S1100). Here, it does not simply store the input content, and instead, an input time and the content of the text are mapped together and stored (S1200). The content stored together with the input time may be a keyboard input or a word unit, a sentence unit, a paragraph unit, or the like. It is preferable to store it in the same or smaller unit as a playback unit, matching the input time.

When a text input process is recorded in this way, recorded text may be sequentially played according to the input time in a later playback mode (S1300). Here, a timeline may be provided for playback, and the timeline may be provided in the form of a branch for version management. It is possible to switch from a playback mode to an editing mode by stopping it in the timeline, or inputting a shortcut key, for example, an esc key (S1400).

In the case of switching to the editing mode, text may be input from the user again (S1100). Depending on which point one switched to the editing mode while playing the text, the newly input text may be added to the end of the previous text, or the newly input text may be added to the middle of the previous text.

In addition, depending on whether a new version has been created, the newly input text may be added to the current version or may be added to the new version. Moreover, it is possible to freely manage history of change by providing a function to merge or delete multiple versions of text.

In addition, it is possible to provide functions such as a dictation mode so that learning may be performed using the playable editor. Further, the similarity between text to be learned and text input by the user may be measured and provided. Also, if learning is programming learning, it is possible to compare and provide source code to be learned and an execution result of the source code input by the user.

Although the operations are shown in a specific order in the drawings, those skilled in the art will appreciate that many variations and modifications can be made to the preferred embodiments without substantially departing from the principles of the present inventive concept. Therefore, the disclosed preferred embodiments of the inventive concept are used in a generic and descriptive sense only and not for purposes of limitation.

What is claimed is:

1. A playable text editor, comprising:
a processor;
a memory; and
a computer program loaded into the memory and executed by the processor,
wherein the computer program comprises:
a storage unit for receiving first text from a user and storing the first text together with first time information when the first text was input;
a control unit for receiving a playback request from the user and sequentially outputting the first text based on the first time information; and
a search unit including a first timeline through which the first time information is searchable,
wherein when second text is input from the user while the first text is being output, the storage unit stores the second text together with second time information when the second text was input, and
wherein the control unit receives the playback request from the user, during sequentially outputting the first text based on the first time information, sequentially outputs the second text based on the second time information, and again, sequentially outputs the rest of the first text based on the first time information.

2. The editor of claim 1,
wherein when second text is input from the user after all of the first text is output, the storage unit stores the second text together with second time information when the second text was input, and
wherein the control unit receives the playback request from the user, sequentially output all of the first text based on the first time information, and then, sequentially output the second text based on the second time information.

3. The editor of claim 2,
wherein the search unit comprises a second timeline through which the second time information is searchable after the end of the first timeline.

4. The editor of claim 1,
wherein the search unit comprises a second timeline through which the second time information is searchable in the middle of the first timeline.

5. The editor of claim 1,
wherein when second text for managing as a new version is input from the user while the first text is being output, the storage unit stores the second text together with second time information when the second text was input, and
wherein the control unit receives the playback request for the new version from the user, during sequentially outputting the first text based on the first time information, sequentially outputs the second text based on the second time information, and does not output the rest of the first text.

6. The editor of claim 5,
wherein the search unit adds a branch in the middle of the first timeline, wherein an original branch comprises the rest of the first timeline and an added another branch comprises a second timeline through which the second time information is searchable.

7. The editor of claim 6,
wherein the control unit receives a merge request for the added branch from the user, compares the first text by the first timeline, a portion of the first text by the second timeline following the middle of the first timeline, and the second text by the second timeline, and displayed to the user.

8. The editor of claim 1,
wherein when second text is input from the user, the storage unit stores the second text together with second time information when the second text was input, and
wherein the search unit comprises a second timeline through which the second time information is searchable, wherein when the user inputting the first text and the user inputting the second text are different, the first timeline and the second timeline are distinguished and displayed.

9. The editor of claim 1,
wherein the control unit sequentially outputs the first text at a preset first time interval based on the first time information, and adjusts the first time interval when a request for adjusting a playback speed for the first text is input.

10. The editor of claim 1,
wherein the control unit receives a merge request for a first text file and a second text file that commonly comprise the first text from the user, compares text of the first text file and text of the second text file, and displayed to the user, and
wherein the search unit creates a first branch and a second branch at the end of the first timeline corresponding to the first text, wherein the first branch comprises a timeline corresponding to uncommon text in the first text file and the second branch comprises a timeline corresponding to uncommon text in the second text file.

11. A method for editing playable text, comprising:
receiving, by a text editor, first text from a user and storing the first text together with first time information when the first text was input;
receiving, by the text editor, a playback request from the user and sequentially outputting the first text based on the first time information; and
providing, by the text editor, a first timeline through which the first time information is searchable,
wherein when second text is input from the user while the first text is being output, the storage unit stores the second text together with second time information when the second text was input, and
wherein the control unit receives the playback request from the user, during sequentially outputting the first text based on the first time information, sequentially outputs the second text based on the second time information, and again, sequentially outputs the rest of the first text based on the first time information.

12. The method of claim 11,
wherein when second text is input from the user after all of the first text is output, storing the first text comprises storing the second text together with second time information when the second text was input, and
wherein sequentially outputting the first text comprises sequentially outputting all of the first text based on the first time information, and then, sequentially output the second text based on the second time information.

13. The method of claim 12,
wherein providing the first timeline comprises providing a second timeline through which the second time information is searchable after the end of the first timeline.

14. The method of claim 11,
wherein providing the first timeline comprises providing a second timeline through which the second time information is searchable in the middle of the first timeline.

15. The method of claim 11,
wherein when second text for managing as a new version is input from the user while the first text is being output, storing the first text comprises storing the second text together with second time information when the second text was input, and
wherein sequentially outputting the first text comprises receiving the playback request for the new version from the user, during sequentially outputting the first text based on the first time information, sequentially outputting the second text based on the second time information, and not outputting the rest of the first text.

16. The method of claim 15,
wherein providing the first timeline comprises adding a branch in the middle of the first timeline, wherein an original branch comprises the rest of the first timeline and an added another branch provides a second timeline through which the second time information is searchable.

17. The method of claim 11,
wherein when second text is input from the user, storing the first text comprises storing the second text together with second time information when the second text was input, and
wherein providing the first timeline comprises a second timeline through which the second time information is searchable, wherein when the user inputting the first text and the user inputting the second text are different, the first timeline and the second timeline are distinguished and displayed.

18. The method of claim 11,
wherein sequentially outputting the first text comprises receiving a merge request for a first text file and a second text file that commonly comprise the first text from the user, comparing text of the first text file and text of the second text file, and displayed to the user, and
wherein providing the first time line comprising creating a first branch and a second branch at the end of the first timeline corresponding to the first text, wherein the first branch comprises a timeline corresponding to uncommon text in the first text file and the second branch provides a timeline corresponding to uncommon text in the second text file.

* * * * *